(12) United States Patent
Do et al.

(10) Patent No.: US 7,948,592 B2
(45) Date of Patent: May 24, 2011

(54) DISPLAY DEVICE FOR INCREASING VIEWING ANGLE

(75) Inventors: Hee-Wook Do, Cheonan-si (KR); Ki-Chul Shin, Seongnam-si (KR); Seung-Hee Lee, Seoul (KR); Sung-Min Kang, Seoul (KR); Kwang-Hyun Kim, Guri-si (KR); Ji-Hoon Kim, Gimpo-si (KR); Sang-Jae Kim, Asan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 180 days.

(21) Appl. No.: 12/469,361

(22) Filed: May 20, 2009

(65) Prior Publication Data
US 2009/0316095 A1    Dec. 24, 2009

(30) Foreign Application Priority Data

Jun. 23, 2008   (KR) .................. 10-2008-0059120
Dec. 9, 2008    (KR) .................. 10-2008-0124826

(51) Int. Cl.
*G02F 1/1335* (2006.01)
(52) U.S. Cl. ............ 349/118; 349/56; 349/84; 349/117; 349/121

(58) Field of Classification Search .................... 349/56, 349/84, 117, 118, 121
See application file for complete search history.

(56) References Cited

U.S. PATENT DOCUMENTS 4,609,256 A * 9/1986 Nakamura .................... 349/101
6,411,355 B1 * 6/2002 Manabe et al. ............... 349/120

FOREIGN PATENT DOCUMENTS

| KR | 1020070056055 | 5/2007 |
| KR | 1020070069090 | 7/2007 |
| KR | 100778167     | 11/2007 |

* cited by examiner

*Primary Examiner* — Jennifer Doan
(74) *Attorney, Agent, or Firm* — H.C. Park & Associates, PLC

(57) ABSTRACT

A display device includes a display panel, a first optical unit, and a second optical unit. The display panel includes a first substrate, a second substrate, and a liquid crystal layer disposed between the first substrate and the second substrate. The liquid crystal layer is operated in a vertical alignment mode. The first optical unit includes a C-plate and a first polarization plate having a first absorption axis. The second optical unit includes a positive A-plate, a negative A-plate, and a second polarization plate having a second absorption axis substantially perpendicular to the first absorption axis. The positive A-plate and the negative A-plate may gather dispersed polarization states of a colored light.

25 Claims, 14 Drawing Sheets

DISPLAY DEVICE FOR INCREASING VIEWING ANGLE

CROSS REFERENCE TO RELATED APPLICATIONS

This application claims priority from and the benefit of Korean Patent Application No. 2008-59120, filed on Jun. 23, 2008, and Korean Patent Application No. 2008-124826, filed on Dec. 9, 2008, which are both hereby incorporated by reference for all purposes as if fully set forth herein.

BACKGROUND OF THE INVENTION

1. Field of the Invention

The present invention relates to a liquid crystal display (LCD) device for displaying an image using light transmittance of liquid crystal molecules.

2. Discussion of the Background

An LCD device includes an LCD panel that displays an image using the light transmittance of liquid crystal molecules, and a backlight assembly disposed under the LCD panel to provide the LCD panel with light.

The LCD panel includes a first substrate, a second substrate facing the first substrate, and a liquid crystal layer interposed between the first and second substrates. The first substrate includes a thin-film transistor (TFT) and a pixel electrode. The second substrate includes a common electrode.

The liquid crystal molecules of the liquid crystal layer may be operated in a vertical alignment mode by an electric field formed between the pixel electrode and the common electrode. For example, when an electric field is not formed between the pixel electrode and the common electrode, the LCD panel may display a white image. Alternatively, when an electric field is formed between the pixel electrode and the common electrode, the LCD panel may display a black image.

When an electric field is formed between the pixel electrode and the common electrode, the liquid crystal molecules of the liquid crystal layer are aligned in a direction substantially perpendicular to the pixel electrode or the common electrode. When the liquid crystal molecules are aligned in a vertical direction, the contrast ratio of an image viewed from the front of the LCD panel may be high, but the contrast ratio of an image viewed from the side of the LCD panel may be low, because the phase of light proceeding toward the side of the LCD panel may be delayed in a thickness direction of the LCD panel by the liquid crystal molecules.

That is, the LCD panel operated in the vertical alignment mode may have a problem in that the contrast ratio of an image viewed from the side of the LCD panel is low, because of the phase retardation in the thickness direction of the LCD panel caused by the liquid crystal molecules.

SUMMARY OF THE INVENTION

The present invention provides a display device for increasing a side viewing angle thereof in a vertical alignment mode.

The present invention also provides a display device that may gather polarization states of red light, green light, and blue light into an extinction point of a Poincare sphere. Accordingly, a decrease of a contrast ratio caused by the dispersion of the polarization states of the light may be prevented, so that the contrast ratio in the side view of the display device may be increased.

Additional features of the invention will be set forth in the description which follows, and in part will be apparent from the description, or may be learned by practice of the invention.

The present invention discloses a display device includes a display panel, a first optical unit, and a second optical unit. The display panel includes a first substrate, a second substrate, and a liquid crystal layer disposed between the first substrate and the second substrate. The liquid crystal layer is vertically aligned. The first optical unit includes a C-plate and a first polarization plate having a first absorption axis. The second optical unit includes a positive A-plate, a negative A-plate disposed over the positive A-plate in a proceeding direction of light, and a second polarization plate having a second absorption axis substantially perpendicular to the first absorption axis. The negative A-plate is a phase retardation film having a thickness-direction phase retardation value (Rth) that satisfies a numerical condition of $Rth \leq 0$ and $nx \neq ny$. The positive A-plate is a phase retardation film having the thickness-direction phase retardation value (Rth) that satisfies a numerical condition of $Rth \geq 0$ and $nx \neq ny$, and the C-plate is a negative C-plate satisfying a numerical condition of "$nx=ny>nz$"

$Rth=\{(nx+ny)/2-nz\} \times d$, and "d" is a thickness of the phase retardation film. "nx" represents a refractive index in an x-axis direction, and "ny" represents a refractive index in a y-axis direction substantially perpendicular to the x-axis. "nz" represents a refractive index in a z-axis direction substantially perpendicular to the x-axis direction and the y-axis direction.

In one example embodiment of the present invention, the first optical unit may be disposed under the display panel in the proceeding direction of the light, and the second optical unit may be disposed over the display panel in the proceeding direction of the light. Alternatively, the first optical unit may be disposed over the display panel in the proceeding direction of the light, and the second optical unit may be disposed under the display panel in the proceeding direction of the light.

In one example embodiment of the present invention, the C-plate may be disposed between the display panel and the first polarization plate, and the positive and negative A-plates may be disposed between the display panel and the second polarization plate.

In some example embodiments of the present invention, one axis of an x-axis and a y-axis of the negative A-plate may be substantially perpendicular to the second absorption axis of the second polarization plate, and a refractive index in a direction of the axis substantially perpendicular to the second absorption axis may be smaller than a refractive index in a direction of the other axis of the x-axis and the y-axis. Further, one axis of the x-axis and the y-axis of the positive A-plate may be substantially parallel with the second absorption axis, and a refractive index in a direction of the axis substantially parallel with the second absorption axis may be larger than a refractive index in a direction of the other axis of the x-axis and the y-axis.

In one example embodiment of the present invention, an in-plane phase retardation value (Ro) and a thickness-direction phase retardation value (Rth) of the negative A-plate may be asymmetric with an in-plane phase retardation value (Ro) and the thickness-direction phase retardation value (Rth) of the positive A-plate. Rth is represented as a formula of $Rth=\{(nx+ny)/2-nz\} \times d$, and Ro is represented as a formula of $Ro=(nx-ny) \times d$, where "d" is a thickness of the phase retardation film. "nx" represents a refractive index in an x-axis direction, and "ny" represents a refractive index in a y-axis direction substantially perpendicular to the x-axis.

In some example embodiments of the present invention, a ratio (Ro_r/λ_r) of the in-plane phase retardation value (Ro_r) of the negative A-plate to a wavelength (λ_r) of red light is in a range of 0.093 to 0.173, and a ratio (Rth_r/λ_r) of the thickness-direction phase retardation value (Rth_r) of the negative A-plate to the wavelength (λ_r) of the red light is in a range of 0.073 to 0.153. A ratio (Ro_g/λ_g) of the in-plane phase retardation value (Ro_g) of the negative A-plate to a wavelength (λ_g) of green light is in a range of 0.108 to 0.188, and a ratio (Rth_g/λ_g) of the thickness-direction phase retardation value (Rth_g) of the negative A-plate to the wavelength (λ_g) of the green light is in a range of 0.086 to 0.166. A ratio (Ro_b/λ_b) of the in-plane phase retardation value (Ro_b) of the negative A-plate to a wavelength (λ_b) of blue light is in a range of 0.140 to 0.220, and a ratio (Rth_b/λ_b) of the thickness-direction phase retardation value (Rth_b) of the negative A-plate to the wavelength (λ_b) of the blue light is in a range of 0.113 to 0.193.

In some example embodiments of the present invention, a ratio (Ro_r/λ_r) of the in-plane phase retardation value (Ro_r) of the positive A-plate to a wavelength (λ_r) of red light is in a range of 0.133 to 0.213, and a ratio (Rth_r/λ_r) of the thickness-direction phase retardation value (Rth_r) of the positive A-plate to the wavelength (λ_r) of the red light is in a range of 0.107 to 0.187. A ratio (Ro_g/λ_g) of the in-plane phase retardation value (Ro_g) of the positive A-plate to the wavelength (λ_g) of green light is in a range of 0.152 to 0.232, and a ratio (Rth_g/λ_g) of the thickness-direction phase retardation value (Rth_g) of the positive A-plate to the wavelength (λ_g) of the green light is in a range of 0.124 to 0.204. A ratio (Ro_b/λ_b) of the in-plane phase retardation value (Ro_b) of the positive A-plate to a wavelength (λ_b) of blue light is in a range of 0.194 to 0.274, and a ratio (Rth_b/λ_b) of the thickness-direction phase retardation value (Rth_b) of the positive A-plate to the wavelength (λ_b) of the blue light is in a range of 0.159 to 0.239.

In one example embodiment of the present invention, an absolute value of a thickness-direction phase retardation value (Rth) of the C-plate may be smaller than an absolute value of a thickness-direction phase retardation value (Rth) of the liquid crystal layer. Here, $Rth=\{(nx+ny)/2-nz\} \times d$, wherein "d" is a thickness of the C-plate. "nx" represents a refractive index in an x-axis direction, and "ny" represents a refractive index in a y-axis direction substantially perpendicular to the x-axis. "nz" represents a refractive index in a z-axis direction substantially perpendicular to the x-axis direction and the y-axis direction.

In one example embodiment of the present invention, a ratio (B) of the difference between the thickness-direction phase retardation values of the liquid crystal layer and the C-plate related to a wavelength of blue light may be larger than a ratio (G) of the difference between the thickness-direction phase retardation values of the liquid crystal layer and the C-plate related to a wavelength of green light. Further, a ratio (G) of the difference between the thickness-direction phase retardation values of the liquid crystal layer and the C-plate related to the wavelength of the green light may be larger than a ratio (R) of the difference between the thickness-direction phase retardation values of the liquid crystal layer and the C-plate related to a wavelength of red light.

In some example embodiments of the present invention, the ratio (R) of the difference between the thickness-direction phase retardation values of the liquid crystal layer and the C-plate related to the wavelength of the red light may be in a range of about 0.01 to about 0.08. The ratio (G) of the difference between the thickness-direction phase retardation values of the liquid crystal layer and the C-plate related to the wavelength of the green light may be in a range of about 0.05 to about 0.135. The ratio (B) of the difference between the thickness-direction phase retardation values of the liquid crystal layer and the C-plate related to the wavelength of the blue light may be in a range of about 0.145 to about 0.230.

In one example embodiment of the present invention, the positive A-plate and the negative A-plate may gather polarization states of red light, green light and blue light, which are dispersed by the C-plate and the liquid crystal layer.

The present invention also discloses a display device including a display panel, a first optical unit, and a second optical unit. The display panel includes a first substrate, a second substrate, and a liquid crystal layer disposed between the first substrate and the second substrate. The liquid crystal layer is vertically aligned. The first optical unit includes a first polarization plate and a C-plate. The first polarization plate is disposed under the first substrate, and has a first absorption axis. The C-plate is disposed between the first polarization plate and the first substrate. The second optical unit includes a second polarization plate, a positive A-plate, and a negative A-plate. The second polarization plate is disposed over the second substrate, and has a second absorption axis substantially perpendicular to the first absorption axis. The positive A-plate is disposed between the second polarization plate and the second substrate. The negative A-plate is disposed under the positive A-plate in a proceeding direction of light.

the negative A-plate is a phase retardation film having a thickness-direction phase retardation value (Rth) that satisfies a numerical condition of $Rth \leq 0$ and $nx \neq ny$, and the positive A-plate is a phase retardation film having a thickness-direction phase retardation value (Rth) that satisfies a numerical condition of $Rth \geq 0$ and $nx \neq ny$. $Rth=\{(nx+ny)/2-nz\} \times d$, and "d" is a thickness of the phase retardation film. "nx" represents a refractive index in an x-axis direction, and "ny" represents a refractive index in a y-axis direction substantially perpendicular to the x-axis. "nz" represents a refractive index in a z-axis direction substantially perpendicular to the x-axis direction and the y-axis direction.

In some example embodiments of the present invention, the negative A-plate may be disposed between the liquid crystal layer and the second substrate. The second substrate may include a plurality of color filters facing the liquid crystal layer, and the negative A-plate may be formed on the color filters to face the liquid crystal layer. Alternatively, the negative A-plate may be disposed between the second substrate and the positive A-plate.

In some example embodiments of the present invention, one axis of an x-axis and a y-axis of the negative A-plate may be substantially parallel with the first absorption axis of the first polarization plate, and a refractive index in a direction of the axis substantially parallel with the first absorption axis may be smaller than a refractive index in a direction of the other axis of the x-axis and the y-axis. One axis of the x-axis and the y-axis of the positive A-plate may be substantially parallel with the first absorption axis, and a refractive index in a direction of the axis substantially parallel with the first absorption axis may be larger than a refractive index in a direction of the other axis of the x-axis and the y-axis.

In some example embodiments of the present invention, an absolute value of an N-Z coefficient (Nz) of the negative A-plate may be in a range of about 0.9 to about 1.1, wherein an absolute value of an N-Z coefficient (Nz) of the positive A-plate is in a range of about 0.9 to about 1.1, and $Nz=(nx-nz)/(nx-ny)$. "nx" represents a refractive index in an x-axis direction, and "ny" represents a refractive index in a y-axis direction substantially perpendicular to the x-axis. "nz" represents a refractive index in a z-axis direction substantially perpendicular to the x-axis direction and the y-axis direction.

An in-plane phase retardation value (Ro) of the negative A-plate in a wavelength range of green light may be in a range of about 47.0 nm to about 49.0 nm. A first negative in-plane dispersion retardation value of the negative A-plate may be in a range of about 1.00 to about 1.20, wherein the first negative in-plane dispersion retardation value is a ratio of an in-plane phase retardation value (Ro) in a wavelength range of blue light to the in-plane phase retardation value (Ro) in the wavelength range of green light. A second negative in-plane dispersion retardation value of the negative A-plate may be in a range of about 0.90 to about 1.10, wherein the second negative in-plane dispersion retardation value is a ratio of an in-plane phase retardation value (Ro) in a wavelength range of red light to the in-plane phase retardation value (Ro) in the wavelength range of green light. Here, Ro=(nx−ny)×d. "nx" represents a refractive index in an x-axis direction, and "ny" represents a refractive index in a y-axis direction substantially perpendicular to the x-axis. "d" is a thickness of the negative A-plate.

In some example embodiments of the present invention, a thickness-direction phase retardation value (Rth) of the negative A-plate in a wavelength range of green light may be in a range of about −23.0 nm to about −25.0 nm. A first negative thickness-direction dispersion retardation value of the negative A-plate may be substantially the same as the first negative in-plane dispersion retardation value of the negative A-plate, wherein the first negative thickness-direction dispersion retardation value is a ratio of an thickness-direction phase retardation value (Rth) in a wavelength range of blue light to the thickness-direction phase retardation value (Rth) in the wavelength range of green light. A second negative thickness-direction dispersion retardation value of the negative A-plate may be substantially the same as the second negative in-plane dispersion retardation value of the negative A-plate, wherein the second negative thickness-direction dispersion retardation value is a ratio of an thickness-direction phase retardation value (Rth) in a wavelength range of red light to the thickness-direction phase retardation value (Rth) in the wavelength range of green light.

The wavelength range of the red light may be in a range of about 640 nm to about 660 nm. The wavelength range of the green light may be in a range of about 540 nm to about 560 nm, and the wavelength range of the blue light may be in a range of about 440 nm to about 460 nm.

In some example embodiments of the present invention, an in-plane phase retardation value (Ro) of the positive A-plate in a wavelength range of green light may be in a range of about 179.5 nm to about 180.5 nm. A first positive in-plane dispersion retardation value of the positive A-plate may be in a range of about 0.880 to about 0.890, wherein the first positive in-plane dispersion retardation value is a ratio of an in-plane phase retardation value (Ro) in a wavelength range of blue light to the in-plane phase retardation value (Ro) in the wavelength range of green light. A second positive in-plane dispersion retardation value of the positive A-plate may be in a range of about 1.000 to about 1.100, wherein the second positive in-plane dispersion retardation value is a ratio of an in-plane phase retardation value (Ro) in a wavelength range of red light to the in-plane phase retardation value (Ro) in the wavelength range of green light. Here, Ro=(nx−ny)×d. "nx" represents a refractive index in an x-axis direction, and "ny" represents a refractive index in a y-axis direction substantially perpendicular to the x-axis. "d" is a thickness of the positive A-plate.

In some example embodiments of the present invention, a thickness-direction phase retardation value (Rth) of the positive A-plate in a wavelength range of green light may be in a range of about 96.0 nm to about 98.0 nm. A first positive thickness-direction dispersion retardation value of the positive A-plate may be substantially the same as the first positive in-plane dispersion retardation value of the positive A-plate, wherein the first positive thickness-direction dispersion retardation value is a ratio of an thickness-direction phase retardation value (Rth) in a wavelength range of blue light to the thickness-direction phase retardation value (Rth) in the wavelength range of green light. A second positive thickness-direction dispersion retardation value of the positive A-plate may be substantially the same as the second positive in-plane dispersion retardation value of the positive A-plate, wherein the second positive thickness-direction dispersion retardation value is a ratio of an thickness-direction phase retardation value (Rth) in a wavelength range of red light to the thickness-direction phase retardation value (Rth) in the wavelength range of green light.

The wavelength range of the red light may be in a range of about 640 nm to about 660 nm. The wavelength range of the green light may be in a range of about 540 nm to about 560 nm, and the wavelength range of the blue light may be in a range of about 440 nm to about 460 nm.

In one example embodiment of the present invention, a subtraction of a negative wavelength-retardation value from a positive wavelength-retardation value in at least one of red light, green light and blue light may be in a range of about 0.20 to about 0.30. Here, the positive wavelength-retardation value is a ratio of the in-plane phase retardation value (Ro) of the positive A-plate to a wavelength (λ) of light, wherein the negative red wavelength-retardation value is a ratio of the in-plane phase retardation value (Ro) of the negative A-plate to the wavelength (λ) of the light. Here, Ro=(nx−ny)×d, wherein Ro and λ are in units of nanometers. "nx" represents a refractive index in an x-axis direction, and "ny" represents a refractive index in a y-axis direction substantially perpendicular to the x-axis. "d" is a thickness of the positive A-plate or the negative A-plate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
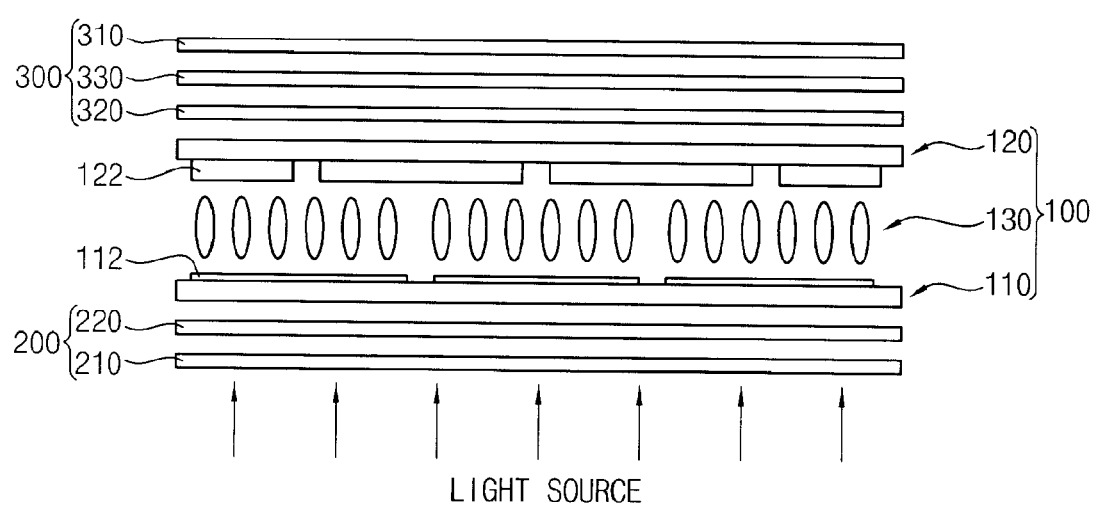
FIG. 1 is a cross-sectional view showing a display device in accordance with a first exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are pro-vided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as shown in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings.

Figure 2:
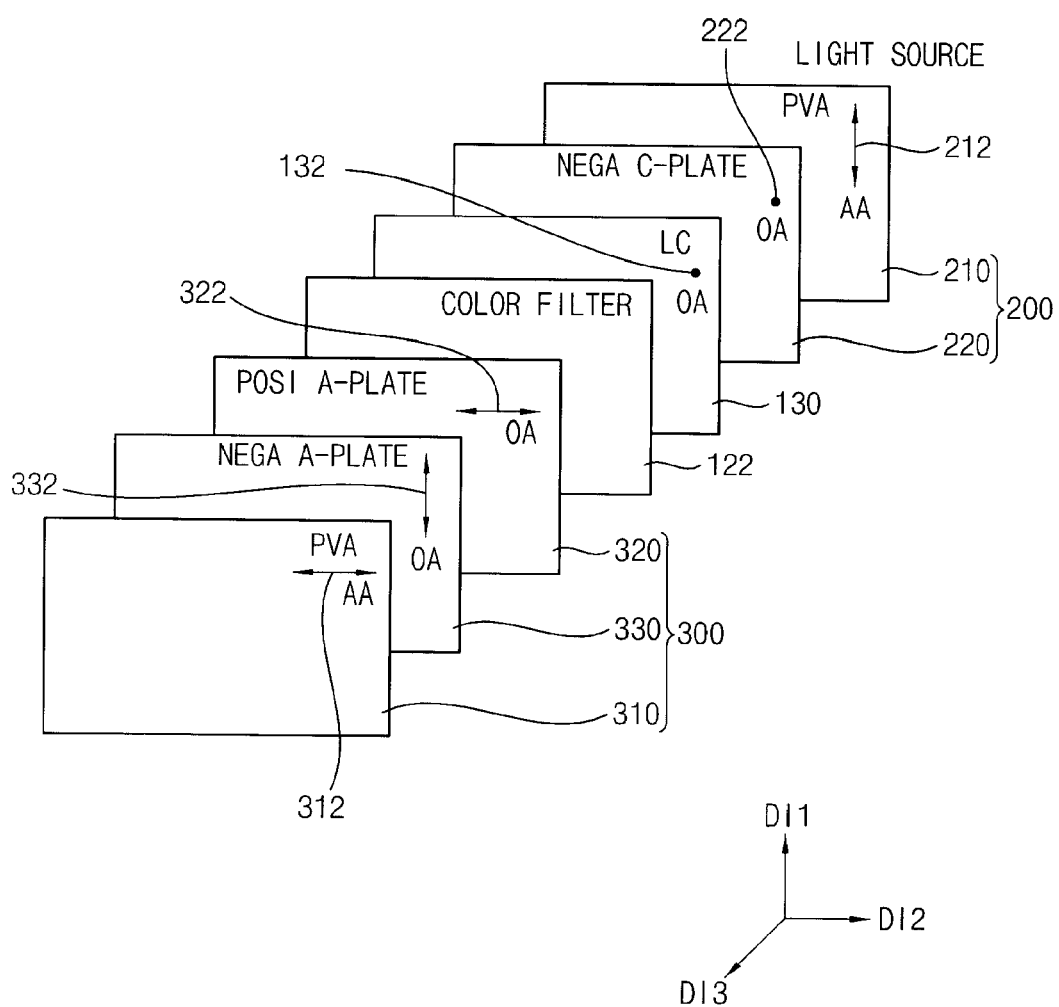
FIG. 2 is a diagram showing a relationship among optical members of the display device shown in FIG. 1.

FIG. 1 is a cross-sectional view showing a display device in accordance with a first exemplary embodiment of the present invention. FIG. 2 is a diagram showing a relationship among optical members of the display device shown in FIG. 1.

Referring to FIG. 1 and FIG. 2, a display device in accordance with the first exemplary embodiment of the present invention includes a display panel 100, a first optical unit 200, and a second optical unit 300.

The display panel 100 includes a first substrate 110, a second substrate 120 facing the first substrate 110, and a liquid crystal layer 130 interposed between the first substrate 110 and the second substrate 120.

The first substrate 110 includes a plurality of signal lines (not shown), a plurality of thin-film transistors (TFTs) (not shown) electrically connected to the signal lines, and a plurality of pixel electrodes 112. The pixel electrodes 112 receive data voltages from the signal lines via the TFTs. The pixel electrodes 112 may include a transparent conductive material.

The second substrate 120 includes a plurality of color filters 122 corresponding to the pixel electrodes 112 and a common electrode (not shown) formed on the color filters 122. The color filters 122 may include red color filters, green color filters, and blue color filters. The common electrode receives a common voltage. The common electrode may include a transparent conductive material.

The liquid crystal layer 130 is disposed between the first substrate 110 and the second substrate 120. The liquid crystal layer 130 may be operated in a vertical alignment mode. That is, when an electric field is not formed between the pixel electrodes 112 and the common electrode, liquid crystal molecules of the liquid crystal layer 130 are aligned in a horizontal direction (i.e., a direction substantially parallel with the first substrate 110). When an electric field is formed between the pixel electrodes 112 and the common electrode, the liquid crystal molecules of the liquid crystal layer 130 are aligned in a vertical direction (i.e., a direction substantially perpendicular to the first substrate 110).

The first optical unit 200 is disposed under the display panel 100. The first optical unit 200 includes a first polarization plate 210 and a C-plate 220. The first polarization plate 210 is disposed under the display panel 100, and the C-plate 220 is disposed between the first polarization plate 210 and the display panel 100. Accordingly, the light generated from a light source disposed under the first polarization plate 210 passes through the first polarization plate 210 and the C-plate 220, and proceeds to the display panel 100.

The second optical unit 300 is disposed over the display panel 100. The second optical unit 300 includes a second polarization plate 310, a positive A-plate 320 and a negative A-plate 330. The second polarization plate 310 is disposed over the display panel 100. The positive A-plate 320 is disposed between the second polarization plate 310 and the display panel 100. The negative A-plate 330 is disposed between the second polarization plate 310 and the positive A-plate 320.

The light having passed through the display panel 100 successively passes through the positive A-plate 320, the negative A-plate 330, and the second polarization plate 310, to display an image. The negative A-plate 330 is disposed over the positive A-plate 320 in the proceeding direction of the light.

Alternatively, the positions of the first optical unit 200 and the second optical unit 300 may be changed with respect to each other. That is, the second optical unit 300 may be disposed under the display panel 100, and the first optical unit 200 may be disposed over the display panel 100.

For example, the second polarization plate 310 may be disposed under the display panel 100, and the positive A-plate 320 may be disposed between the second polarization plate 310 and the display panel 100. The negative A-plate 330 may be disposed between the positive A-plate 320 and the display panel 100. In this case, the negative A-plate 330 is disposed over the positive A-plate 320 in the proceeding direction of the light.

Further, the first polarization plate 210 may be disposed over the display panel 100, and the C-plate 220 may be disposed between the first polarization plate 210 and the display panel 100.

The first polarization plate 210 has a first absorption axis 212 substantially parallel with a first direction DI1 and a first polarization axis (not shown) substantially parallel with a second direction DI2 that is substantially perpendicular to the first direction DI1. Light having passed through the first polarization plate 210 is polarized into the second direction DI2. A third direction DI3 represents a proceeding direction of the light, which is substantially perpendicular to each of the first and second directions DI1 and DI2.

The C-plate 220 is disposed over the first polarization plate 210, and has an optical axis 222 substantially parallel to the third direction DI3. The C-plate 220 may be a negative C-plate satisfying a numerical condition of "nx=ny>nz". Herein, "nx" represents a refractive index in an x-axis direction. Further, "ny" represents a refractive index in a y-axis direction, and "nz" represents a refractive index in a z-axis direction. In this exemplary embodiment, the x-axis direction is substantially parallel with the second direction DI2. Further, the y-axis direction is substantially parallel with the first direction DI1, and the z-axis direction is substantially parallel with the third direction DI3.

An in-plane phase retardation value (Ro) of the C-plate 220 is zero because nx is equal to ny (nx=ny). The in-plane phase retardation value (Ro) of the C-plate 220 is (nx−ny)×d, wherein "d" represents the thickness of the C-plate 220.

A thickness-direction phase retardation value (Rth) of the C-plate 220 is positive because nx and ny are larger than nz (nx=ny>nz). The thickness-direction phase retardation value (Rth) of the C-plate 220 is {(nx+ny)/2−nz}×d.

The liquid crystal layer 130 is disposed over the C-plate 220. The liquid crystal layer 130 may be operated in a vertical alignment mode. The liquid crystal layer 130 may have a refractive index substantially opposite to the refractive index of the C-plate 220. The liquid crystal layer 130 may have an optical axis 132 substantially parallel with the third direction DI3. The direction of the optical axis 132 of the liquid crystal layer 130 may be opposite to the direction of the optical axis 222 of the C-plate 220. The liquid crystal layer 130 may satisfy a numerical condition of "nx=ny<nz".

An in-plane phase retardation value (Ro) of the liquid crystal layer 130 is zero because nx is equal to ny (nx=ny). A thickness-direction phase retardation value (Rth) of the liquid crystal layer 130 is negative because nx and ny are smaller than nz (nx=ny<nz). The thickness-direction phase retardation value (Rth) of the liquid crystal layer 130 is {(nx+ny)/2−nz}×d, wherein "d" represents the thickness of the liquid crystal layer 130.

In the present exemplary embodiment, an absolute value of a thickness-direction phase retardation value (Rth) of the C-plate 220 may be an absolute value of the thickness-direction phase retardation value (Rth) of the liquid crystal layer 130. For example, the thickness-direction phase retardation value (Rth) of the C-plate 220 is about 225 nanometers (nm) for green light, and the thickness-direction phase retardation value (Rth) of the liquid crystal layer 130 is about −277 nm for green light.

The color filters 122 are disposed over the liquid crystal layer 130. The color filters 122 change white light to color light such as red light, green light, blue light, etc. For example, the color filters 122 may transmit one of the red light, green light, and blue light that are included in the white light.

The positive A-plate 320 is disposed over the color filters 122. The positive A-plate 320 has an optical axis 322 substantially parallel with the second direction DI2. One of the x-axis and the y-axis of the positive A-plate 320, in which direction the refractive index (i.e., nx or ny) is larger than that of the other, may be substantially parallel with the second direction DI2. That is, one axis of the x-axis and the y-axis of the positive A-plate 320 may be substantially parallel with the second direction DI2, and a refractive index in a direction of the axis substantially parallel with the second direction DI2 may be larger than a refractive index in a direction of the other axis of the x-axis and the y-axis. For example, when a refractive index (ny) in the y-axis direction is larger than a refractive index (nx) in the x-axis direction, the y-axis of the positive A-plate 320 may be substantially parallel with the first direction DI1.

The positive A-plate 320 may be a phase retardation film whose thickness-direction phase retardation value (Rth) satisfies a numerical condition of Rth≧0 and nx≠ny. The thickness-direction phase retardation value (Rth) of the positive A-plate 320 is $\{(nx+ny)/2-nz\} \times d$, wherein "d" represents the thickness of the positive A-plate 320.

The negative A-plate 330 is disposed over the positive A-plate 320. The negative A-plate 330 has an optical axis 332 substantially parallel with the first direction DI1. That is, the optical axis 332 is substantially perpendicular to the optical axis 322 of the positive A-plate 320. Further, one of the x-axis and the y-axis of the negative A-plate 330, in which direction the refractive index (i.e., nx or ny) is smaller than that of the other, may be substantially perpendicular to the second direction DI2. That is, one axis of the x-axis and the y-axis of the negative A-plate 330 may be substantially perpendicular to the second direction DI2, and a refractive index in a direction of the axis substantially perpendicular to the second direction DI2 may be smaller than a refractive index in a direction of the other axis of the x-axis and the y-axis. For example, when a refractive index (nx) in the x-axis direction is smaller than a refractive index (ny) in the y-axis direction, the x-axis of the negative A-plate 330 may be substantially perpendicular to the first direction DI1.

The negative A-plate 330 may be a phase retardation film whose thickness-direction phase retardation value (Rth) satisfies a numerical condition of Rth≦0 and nx≠ny. The thickness-direction phase retardation value (Rth) of the negative A-plate 330 is $\{(nx+ny)/2-nz\} \times d$, wherein "d" represents the thickness of the negative A-plate 330.

An in-plane phase retardation value (Ro) and the thickness-direction phase retardation value (Rth) of the negative A-plate 330 may be asymmetric with an in-plane phase retardation value (Ro) and the thickness-direction phase retardation value (Rth) of the positive A-plate 320. For example, the in-plane phase retardation value (Ro) of the negative A-plate 330 may be about 106 nm for green light, and the thickness-direction phase retardation value (Rth) of the negative A-plate 330 may be about 90 nm for green light. In contrast, the in-plane phase retardation value (Ro) of the positive A-plate 320 may be about 81 nm for green light, and the thickness-direction phase retardation value (Rth) of the positive A-plate 320 may be about −69 nm for green light.

The second polarization plate 310 is disposed over the negative A-plate 330. The second polarization plate 310 has a second absorption axis 312 substantially parallel with the second direction DI2 and a second polarization axis (not shown) substantially parallel with the first direction DI1.

In one exemplary embodiment of the present invention, one of the x-axis and the y-axis of the negative A-plate 330, in which direction the refractive index (i.e., nx or ny) is smaller than that of the other, may be substantially perpendicular to the second absorption axis 312 of the second polarization plate 310. That is, one axis of the x-axis and the y-axis of the negative A-plate 330 may be substantially perpendicular to the second absorption axis 312 of the second polarization plate 310, and a refractive index in a direction of the axis substantially perpendicular to the second absorption axis 312 may be smaller than a refractive index in a direction of the other axis of the x-axis and the y-axis.

Further, one of the x-axis and the y-axis of the positive A-plate 320, in which direction the refractive index (i.e., nx or ny) is larger than that of the other, may be substantially perpendicular to the second absorption axis 312 of the second polarization plate 310. That is, one axis of the x-axis and the y-axis of the positive A-plate 320 may be substantially parallel with the second absorption axis 312 of the second polarization plate 310, and a refractive index in a direction of the axis substantially parallel with the second absorption axis 312 may be larger than a refractive index in a direction of the other axis of the x-axis and the y-axis.

Figure 3:
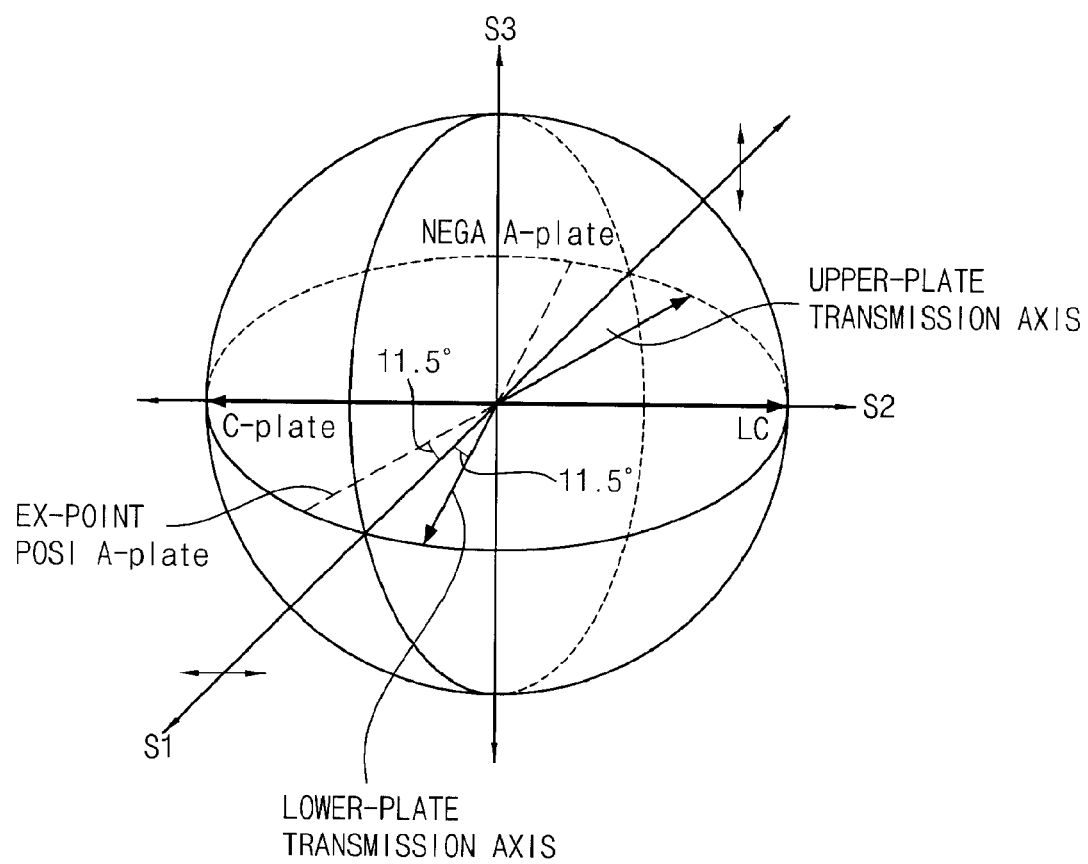
FIG. 3 is a graph showing a relationship between the absorption axis and the optical axis of the optical members in FIG. 2 using a Poincare sphere.

FIG. 3 is a graph showing a relationship between the absorption axis and the optical axis of the optical members in FIG. 2.

Referring to FIG. 2 and FIG. 3, a Poincare sphere has three coordinate axes including a first coordinate axis SI, a second coordinate axis S2, and a third coordinate axis S3. The Poincare sphere is a sphere for stereoscopically describing a state of polarization in a side view of the display device. For example, the Poincare sphere shown in FIG. 3 shows a state of polarization when an observer views the display device at an azimuth angle of about 45 degrees and a polar angle of about 60 degrees with respect to the plane of the display device.

The optical axis (i.e., an axis of rotation) of the liquid crystal layer 130 is directed to a direction of the second coordinate axis S2, and the optical axis (i.e., an axis of rotation) of the C-plate 220 is directed to an opposite direction of the second coordinate axis S2.

The first polarization axis of the first polarization plate 210 (i.e., a lower-plate transmission axis) is placed on a plane formed by the first and second coordinate axes S1 and S2. The first polarization axis is inclined at about 11.5 degrees in a counterclockwise direction with respect to the first coordinate axis S1.

The second polarization axis of the second polarization plate 310 (i.e., an upper-plate transmission axis) is placed on the plane formed by the first and second coordinate axes S1 and S2. The upper-plate transmission axis and the lower-plate transmission axis are symmetric with respect to the second coordinate axis S2.

The optical axis of the positive A-plate 320 is placed on the plane formed by the first and second coordinate axes S1 and S2. The optical axis of the positive A-plate 320 and the lower-plate transmission axis are symmetric with respect to the first coordinate axis S1. That is, the optical axis of the positive A-plate 320 is inclined at about 11.5 degrees in a clockwise direction with respect to the first coordinate axis S1.

The optical axis of the negative A-plate 330 is placed on the plane formed by the first and second coordinate axes S1 and S2. The optical axis of the negative A-plate 330 and the upper-plate transmission axis are symmetric with respect to the first coordinate axis S1.

An extinction point of the Poincare sphere may coincide with the optical axis of the positive A-plate 320. The extinction point is a point corresponding to an ideal polarization state of light passing from the first polarization plate 210 to the negative A-plate 330. When the polarization states of the light having passed from the first polarization plate 210 to the negative A-plate 330 are gathered into the extinction point, a contrast ratio in the side view of the display device may be the maximum.

Figure 4:
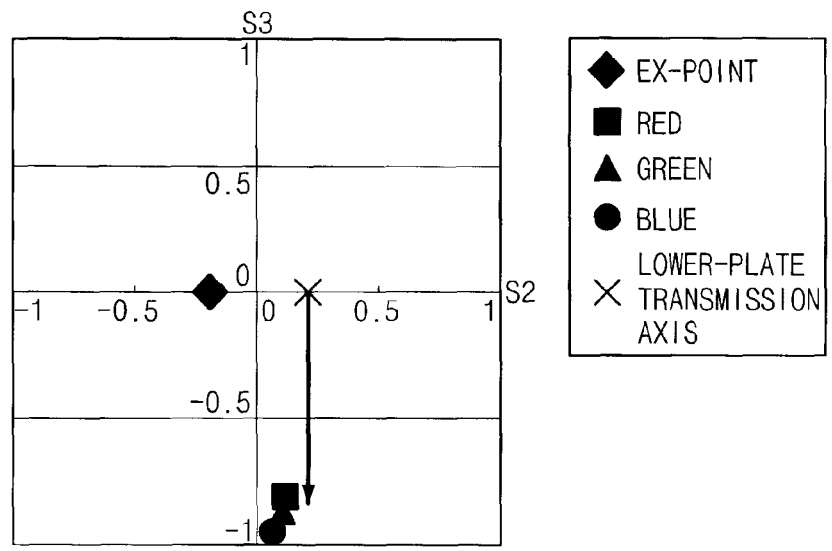
FIG. 4 is a graph showing a polarization state after light passes through the C-plate shown in FIG. 2 using a Poincare plane.

FIG. 4 is a graph showing a polarization state after light passes through the C-plate shown in FIG. 2 using a Poincare plane.

Referring to FIG. 2, FIG. 3, and FIG. 4, the Poincare plane in FIG. 4 is a plan view of the Poincare sphere in view of the first coordinate axis S1. That is, the Poincare plane is formed by the second and third coordinate axes S2 and S3. The numerical values of the coordinate axes are a relative distance from the center of the Poincare sphere when the radius of the Poincare sphere corresponds to one arbitrary unit.

When the light passes through the first polarization plate 210 but does not yet pass through the C-plate 220, polarization states of red light, green light, and blue light are placed on the second coordinate axis S2 of the Poincare plane. The polarization states of the red light, the green light, and the blue light having passed through the first polarization plate 210 are separated from the center of the Poincare plane to a right side along the second coordinate axis S2. The extinction point is separated from the center of the Poincare plane to a left side along the second coordinate axis S2.

When the light passes through the C-plate 220, the polarization states of the red light, the green light, and the blue light move downward along the third coordinate axis S3 by a first distance. The polarization states of the colored light may be dispersed.

Figure 5:
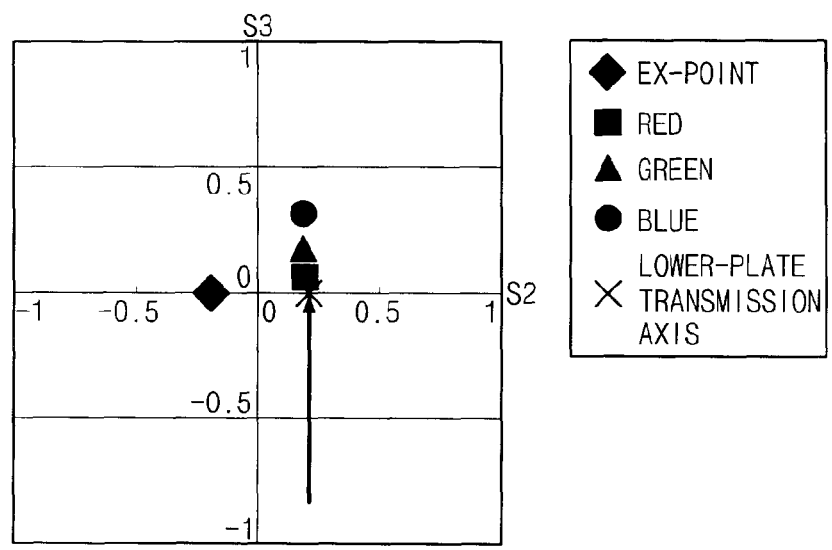
FIG. 5 is a graph showing a polarization state after light passes through the liquid crystal layer shown in FIG. 2 using a Poincare plane.

FIG. 5 is a graph showing a polarization state after light passes through the liquid crystal layer shown in FIG. 2 using the Poincare plane.

Referring to FIG. 2 and FIG. 5, the red light, the green light, and the blue light further pass through the liquid crystal layer 130 after having passed through the C-plate 220. The polarization states of the colored light having passed through the liquid crystal layer 130 move upward along the third coordinate axis S3 by a second distance. The second distance may be larger than the first distance. Accordingly, the polarization states of the colored light having passed through the liquid crystal layer 130 may be placed at an upper position with respect to the second coordinate axis S2. The polarization states of the colored light may be dispersed further than the case when the light passes through the C-plate 220.

Figure 6:
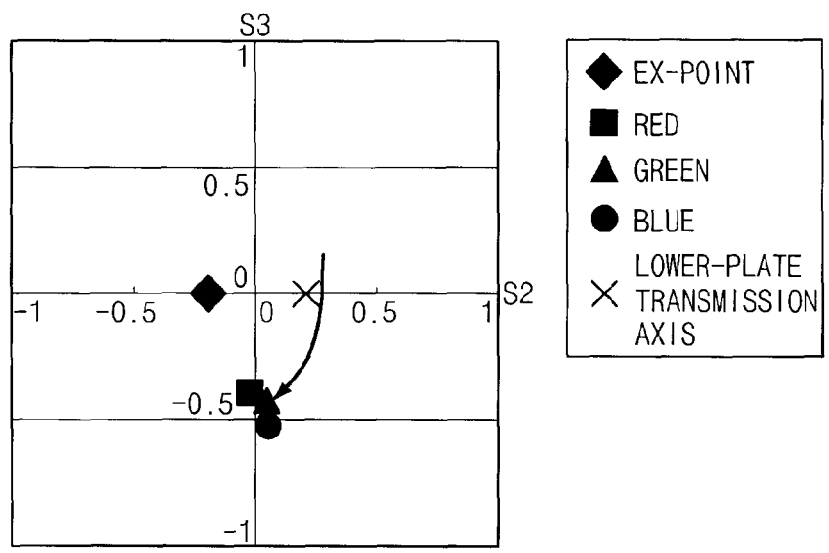
FIG. 6 is a graph showing a polarization state after light passes through the positive A-plate shown in FIG. 2 using a Poincare plane.

FIG. 6 is a graph showing a polarization state after light passes through the positive A-plate shown in FIG. 2 using the Poincare plane.

Referring to FIG. 2 and FIG. 6, the red light, the green light, and the blue light further pass through the color filter 122 after having passed through the liquid crystal layer 130. The color filter 122 selectively transmits only one of the red light, the green light, and the blue light.

The red light, the green light, and the blue light further pass through the positive A-plate 320 after having passed through the color filter 122. The polarization states of the colored light having passed through the positive A-plate 320 move downward along the third coordinate axis S3 by a third distance to be disposed adjacent to the third coordinate axis S3. The third distance may be smaller than the first distance. The dispersed polarization states of the colored light may be gathered.

Figure 7:
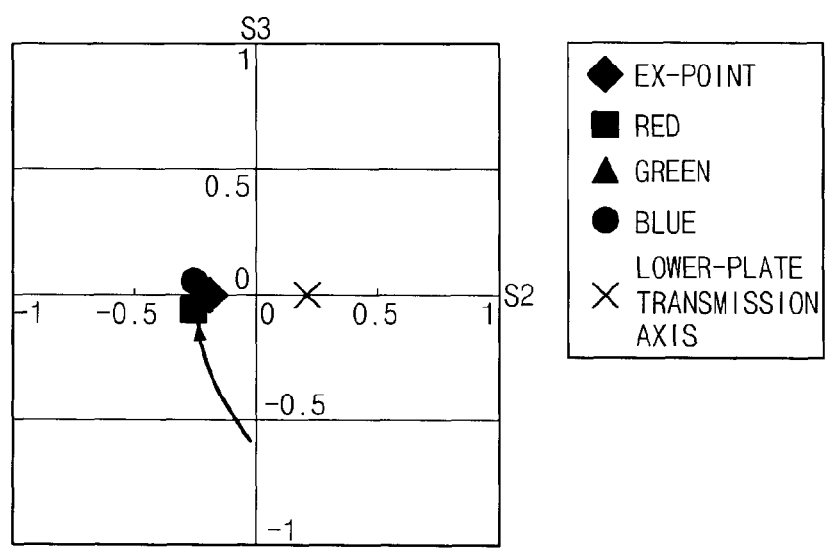
FIG. 7 is a graph showing a polarization state after light passes through the negative A-plate shown in FIG. 2 using a Poincare plane.

FIG. 7 is a graph showing a polarization state after light passes through the negative A-plate shown in FIG. 2 using the Poincare plane.

Referring to FIG. 2 and FIG. 7, the red light, the green light, and the blue light further pass through the negative A-plate 330 after having passed through the positive A-plate 320. The polarization states of the colored light having passed through the negative A-plate 330 move upward along the third coordinate axis S3 by a fourth distance to be disposed adjacent to the extinction point. The fourth distance may be smaller than the third distance. The polarization states of the colored light may be further gathered.

As described above, in the side view of the display device, the positive and negative A-plates 320 and 330 may gather the polarization states of the red light, the green light, and the blue light dispersed by the C-plate 220 and the liquid crystal layer 130 into the extinction point of the Poincare sphere, so that the polarization states of the color light substantially coincide with the extinction point. Accordingly, the contrast ratio in the side view of the display device may be increased.

Figure 8:
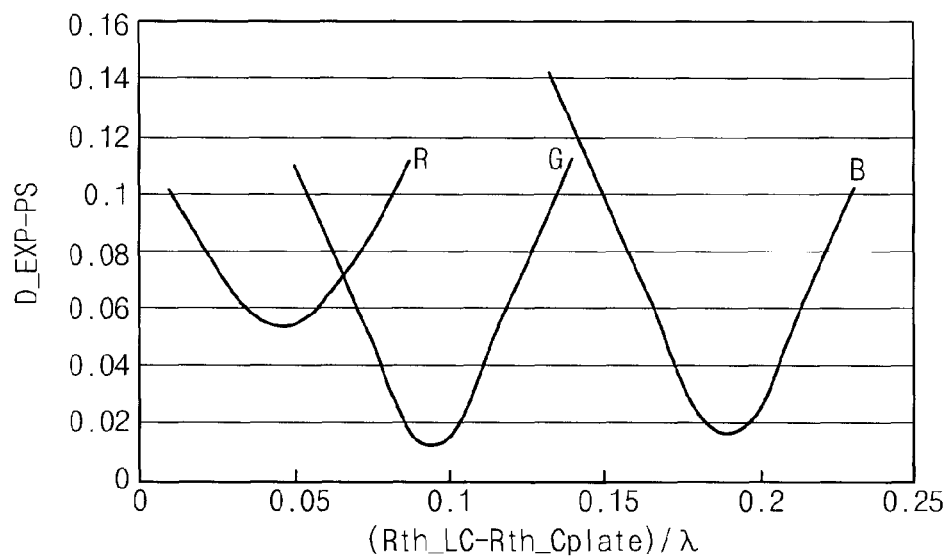
FIG. 8 is a graph showing a relationship between "a ratio of a difference between thickness-direction phase retardation values of the liquid crystal layer and the C-plate to each wavelength of the color light" and "a distance between the extinction point and each polarization state of the color light in the Poincare plane".

FIG. 8 is a graph showing a relationship between "a ratio of a difference between thickness-direction phase retardation values of the liquid crystal layer and the C-plate related to each wavelength of the color light" and "a distance between the extinction point and each polarization state of the color light in the Poincare plane."

Referring to FIG. 2, FIG. 7, and FIG. 8, the vertical axis (D_EXP-PS) of the graph in FIG. 8 represents a distance between the extinction point and each polarization state of the colored light passing from the first polarization plate 210 to the negative A-plate 330. The horizontal axis (Rth_LC−Rth_Cplate/λ) of the graph represents a ratio of a difference between thickness-direction phase retardation values of the liquid crystal layer 130 and the C-plate 220 related to each wavelength (λ) of the color light. The numerical values of the vertical axis (D_EXP-PS) are a relative distance from the center of the Poincare sphere when the radius of the Poincare sphere corresponds to one arbitrary unit.

"R" represents a relationship between "a ratio of a difference between thickness-direction phase retardation values of the liquid crystal layer 130 and the C-plate 220 to a wavelength (λ) of the red light" and "a distance (D_EXP-PS) between the extinction point and a polarization state of the red light in the Poincare plane". "G" represents a relationship between "a ratio of a difference between thickness-direction phase retardation values of the liquid crystal layer 130 and the C-plate 220 to a wavelength (λ) of the green light" and "a distance (D_EXP-PS) between the extinction point and a polarization state of the green light in the Poincare plane". Further, "B" represents a relationship between "a ratio of a difference between thickness-direction phase retardation values of the liquid crystal layer 130 and the C-plate 220 to a wavelength (λ) of the blue light" and "a distance (D_EXP-PS) between the extinction point and a polarization state of the blue light in the Poincare plane".

The liquid crystal layer 130 and the C-plate 220 in accordance with an exemplary embodiment of the present invention satisfy the following conditions to obtain an optimum contrast ratio in a side view.

The ratio (Rth_LC−Rth_Cplate /λ) of the difference (Rth_LC−Rth_Cplate) between the thickness-direction phase retardation values of the liquid crystal layer 130 and the C-plate 220 related to each wavelength (λ) of the colored light is adjusted so that a distance (D_EXP-PS) between the extinction point and each polarization state of the colored light passing from the first polarization plate 210 to the negative A-plate 330 is within about 0.1 arbitrary units.

For example, the ratio (R) of the difference (Rth_LC−Rth_Cplate) between the thickness-direction phase retardation values of the liquid crystal layer 130 and the C-plate 220 to the wavelength (λ) of the red light may be in a range of about 0 to about 0.08, preferably, in a range of about 0.01 to about 0.08. The ratio (G) of the difference (Rth_LC−Rth_Cplate) between the thickness-direction phase retardation values of the liquid crystal layer 130 and the C-plate 220 to the wavelength (λ) of the green light may be in a range of about 0.05 to about 0.135. Further, the ratio (B) of the difference (Rth_LC−Rth_Cplate) between the thickness-direction phase retardation values of the liquid crystal layer 130 and the C-plate 220 to the wavelength (λ) of the blue light may be in a range of about 0.145 to about 0.230.

Further, the ratio (B) of the difference (Rth_LC−Rth_Cplate) between the thickness-direction phase retardation values of the liquid crystal layer 130 and the C-plate 220 to the wavelength (λ) of the blue light is larger than the ratio (G) of the difference (Rth_LC−Rth_Cplate) between the thickness-direction phase retardation values of the liquid crystal layer 130 and the C-plate 220 to the wavelength (λ) of the green light.

Further, the ratio (G) of the difference (Rth_LC−Rth_Cplate) between the thickness-direction phase retardation values of the liquid crystal layer 130 and the C-plate 220 to the wavelength (λ) of the green light is larger than the ratio (R) of the difference (Rth_LC−Rth_Cplate) between the thickness-direction phase retardation values of the liquid crystal layer 130 and the C-plate 220 to the wavelength (λ) of the red light.

Figure 9:
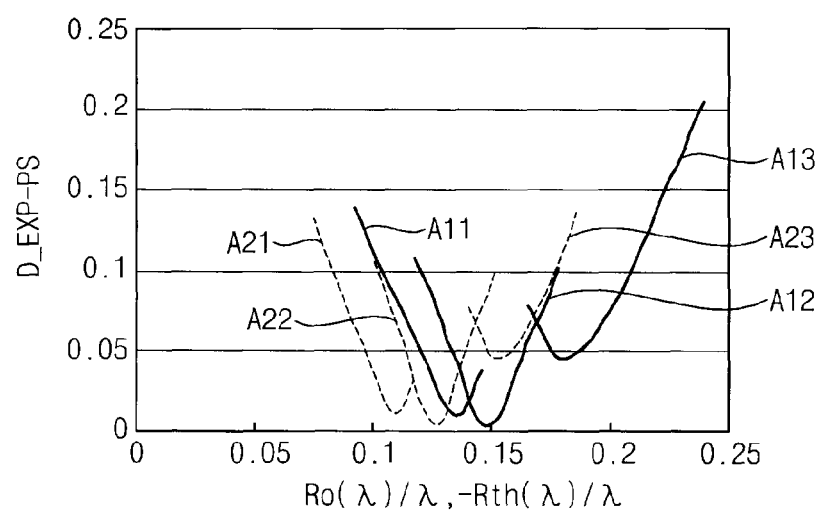
FIG. 9 is a graph showing a relationship between "a ratio of an in-plane phase retardation value of the negative A-plate related to each wavelength of the color light" and "a distance between the extinction point and each polarization state of the color light in the Poincare plane," and a relationship between "a ratio of a thickness-direction phase retardation value of the negative A-plate related to each wavelength of the color light" and "a distance between the extinction point and each polarization state of the color light in the Poincare plane".

FIG. 9 is a graph showing a relationship between "a ratio of an in-plane phase retardation value of the negative A-plate related to each wavelength of the colored light" and "a distance between the extinction point and each polarization state of the colored light in the Poincare plane," and a relationship between "a ratio of a thickness-direction phase retardation value of the negative A-plate related to each wavelength of the colored light" and "a distance between the extinction point and each polarization state of the colored light in the Poincare plane".

Referring to FIG. 2, FIG. 7, and FIG. 9, the vertical axis (D_EXP-PS) of the graph in FIG. 9 represents a distance between the extinction point and each polarization state of the color light passing from the first polarization plate 210 to the negative A-plate 330. The horizontal axis (Ro(λ)/λ, −Rth(λ)/λ) of the graph represents a ratio (Ro(λ)/λ) of an in-plane phase retardation value of the negative A-plate 330 related to each wavelength (λ) of the color light or a ratio (−Rth(λ)/λ) of a thickness-direction phase retardation value of the negative A-plate 330 related to each wavelength (λ) of the colored light. The numerical values of the vertical axis (D_EXP-PS) are a relative distance from the center of the Poincare sphere when the radius of the Poincare sphere corresponds to one arbitrary unit.

"A11" represents a relationship between "a ratio (Ro(λ)/λ) of an in-plane phase retardation value of the negative A-plate 330 to a wavelength (λ) of the red light" and "a distance (D_EXP-PS) between the extinction point and a polarization state of the red light in the Poincare plane". "A12" represents a relationship between "a ratio (Ro(λ)/λ) of an in-plane phase retardation value of the negative A-plate 330 to a wavelength (λ) of the green light" and "a distance (D_EXP-PS) between the extinction point and a polarization state of the green light in the Poincare plane". Further, "A13" represents a relationship between "a ratio (Ro(λ)/λ) of an in-plane phase retardation value of the negative A-plate 330 to a wavelength (λ) of the blue light" and "a distance (D_EXP-PS) between the extinction point and a polarization state of the blue light in the Poincare plane".

"A21" represents a relationship between "a ratio (−Rth(λ)/λ) of a thickness-direction phase retardation value of the negative A-plate 330 to a wavelength (λ) of the red light" and "a distance (D_EXP-PS) between the extinction point and a polarization state of the red light in the Poincare plane". "A22" represents a relationship between "a ratio (−Rth(λ)/λ) of a thickness-direction phase retardation value of the negative A-plate 330 to a wavelength (λ) of the green light" and "a distance (D_EXP-PS) between the extinction point and a polarization state of the green light in the Poincare plane". Further, "A23" represents a relationship between "a ratio (−Rth(λ)/λ) of a thickness-direction phase retardation value of the negative A-plate 330 to a wavelength (λ) of the blue light" and "a distance (D_EXP-PS) between the extinction point and a polarization state of the blue light in the Poincare plane".

The negative A-plate 330 in accordance with the present invention satisfies the following conditions to obtain an optimum contrast ratio in a side view.

The ratios (Ro(λ)/λ), −Rth(λ)/λ) of an in-plane phase retardation value and a thickness-direction phase retardation value of the negative A-plate 330 to a wavelength (λ) of the color light are adjusted so that a distance (D_EXP-PS) between the extinction point and each polarization state of the color light passing from the first polarization plate 210 to the negative A-plate 330 is within about 0.1 arbitrary units.

For example, the ratio (A11) of the in-plane phase retardation value of the negative A-plate 330 to the wavelength (λ) of the red light may be in a range of about 0.093 to about 0.173, and the ratio (A21) of the thickness-direction phase retardation value of the negative A-plate 330 to the wavelength (λ) of the red light may be in a range of about 0.073 to about 0.153.

Further, the ratio (A12) of the in-plane phase retardation value of the negative A-plate 330 to the wavelength (λ) of the green light may be in a range of about 0.108 to about 0.188, and the ratio (A22) of the thickness-direction phase retardation value of the negative A-plate 330 to the wavelength (λ) of the green light may be in a range of about 0.086 to about 0.166.

Further, the ratio (A13) of the in-plane phase retardation value of the negative A-plate 330 to the wavelength (λ) of the blue light may be in a range of about 0.140 to about 0.220, and the ratio (A23) of the thickness-direction phase retardation value of the negative A-plate 330 to the wavelength (λ) of the blue light may be in a range of about 0.113 to about 0.193.

Figure 10:
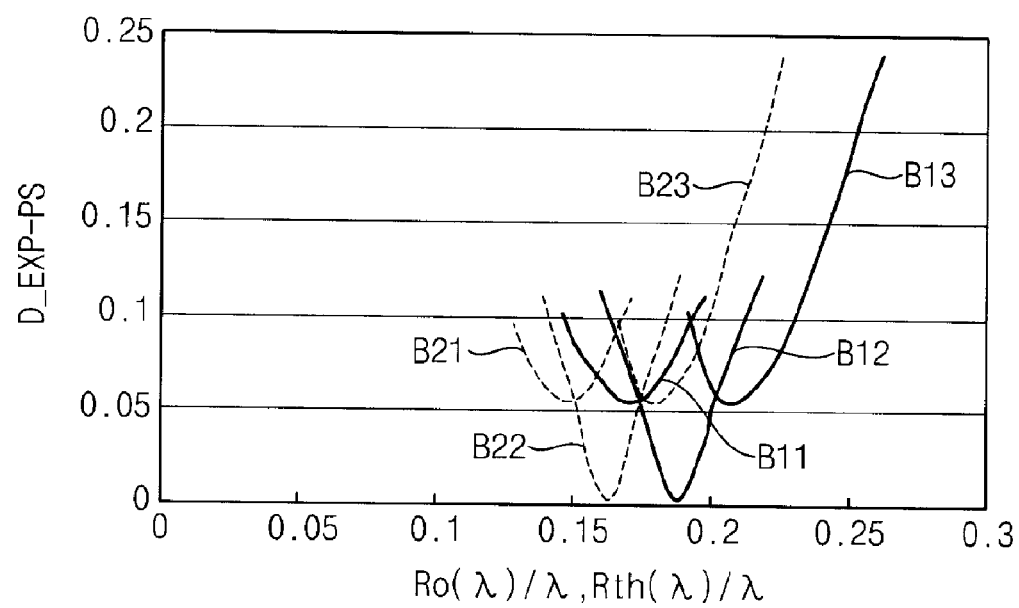
FIG. 10 is a graph showing a relationship between "a ratio of an in-plane phase retardation value of the positive A-plate related to each wavelength of the color light" and "a distance between the extinction point and each polarization state of the color light in the Poincare plane," and a relationship between "a ratio of a thickness-direction phase retardation value of the positive A-plate related to each wavelength of the color light" and "a distance between the extinction point and each polarization state of the color light in the Poincare plane".

FIG. 10 is a graph showing a relationship between "a ratio of an in-plane phase retardation value of the positive A-plate related to each wavelength of the color light" and "a distance between the extinction point and each polarization state of the color light in the Poincare plane," and a relationship between "a ratio of a thickness-direction phase retardation value of the positive A-plate related to each wavelength of the color light" and "a distance between the extinction point and each polarization state of the color light in the Poincare plane".

Referring to FIG. 2, FIG. 7, and FIG. 10, the vertical axis (D_EXP-PS) of the graph in FIG. 10 represents a distance between the extinction point and each polarization state of the colored light passing from the first polarization plate 210 to the positive A-plate 320. The horizontal axis (Ro(λ)/λ, Rth (λ)/λ) of the graph represents a ratio (Ro(λ)/λ) of an in-plane phase retardation value of the positive A-plate 320 related to each wavelength (λ) of the colored light or a ratio (Rth(λ)/λ) of a thickness-direction phase retardation value of the positive A-plate 320 related to each wavelength (λ) of the colored light. The numerical values of the vertical axis (D_EXP-PS) are a relative distance from the center of the Poincare sphere when the radius of the Poincare sphere corresponds to one arbitrary unit.

"B11" represents a relationship between "a ratio (Ro(λ)/λ) of an in-plane phase retardation value of the positive A-plate 320 to a wavelength (λ) of the red light" and "a distance (D_EXP-PS) between the extinction point and a polarization state of the red light in the Poincare plane". "B12" represents a relationship between "a ratio (Ro(λ)/λ) of an in-plane phase retardation value of the positive A-plate 320 to a wavelength (λ) of the green light" and "a distance (D_EXP-PS) between the extinction point and a polarization state of the green light in the Poincare plane". Further, "B13" represents a relationship between "a ratio (Ro(λ)/λ) of an in-plane phase retardation value of the positive A-plate 320 to a wavelength (λ) of the blue light" and "a distance (D_EXP-PS) between the extinction point and a polarization state of the blue light in the Poincare plane".

"B21" represents a relationship between "a ratio (Rth(λ)/λ) of a thickness-direction phase retardation value of the positive A-plate 320 to a wavelength (λ) of the red light" and "a distance (D_EXP-PS) between the extinction point and a polarization state of the red light in the Poincare plane". "B22" represents a relationship between "a ratio (Rth(λ)/λ) of a thickness-direction phase retardation value of the positive A-plate 320 to a wavelength (λ) of the green light" and "a distance (D_EXP-PS) between the extinction point and a polarization state of the green light in the Poincare plane". Further, "B23" represents a relationship between "a ratio (Rth(λ)/λ) of a thickness-direction phase retardation value of the positive A-plate 320 to a wavelength (λ) of the blue light" and "a distance (D_EXP-PS) between the extinction point and a polarization state of the blue light in the Poincare plane".

The positive A-plate 320 in accordance with the present invention satisfies the following conditions to obtain an optimum contrast ratio in a side view.

The ratios (Ro(λ)/λ, Rth(λ)/λ) of an in-plane phase retardation value and a thickness-direction phase retardation value of the positive A-plate 320 to a wavelength (λ) of the colored light are adjusted so that a distance (D_EXP-PS) between the extinction point and each polarization state of the color light passing from the first polarization plate 210 to the positive A-plate 320 is within about 0.1 arbitrary units.

For example, the ratio (B11) of the in-plane phase retardation value of the positive A-plate 320 to the wavelength (λ) of the red light may be in a range of about 0.133 to about 0.213, and the ratio (B21) of the thickness-direction phase retardation value of the positive A-plate 320 to the wavelength (λ) of the red light may be in a range of about 0.107 to about 0.187.

Further, the ratio (B12) of the in-plane phase retardation value of the positive A-plate 320 to the wavelength (λ) of the green light may be in a range of about 0.152 to about 0.232, and the ratio (B22) of the thickness-direction phase retardation value of the positive A-plate 320 to the wavelength (λ) of the green light may be in a range of about 0.124 to about 0.204.

Further, the ratio (B13) of the in-plane phase retardation value of the positive A-plate 320 to the wavelength (λ) of the blue light may be in a range of about 0.194 to about 0.274, and the ratio (B23) of the thickness-direction phase retardation value of the positive A-plate 320 to the wavelength (λ) of the blue light may be in a range of about 0.159 to about 0.239.

Figure 11:
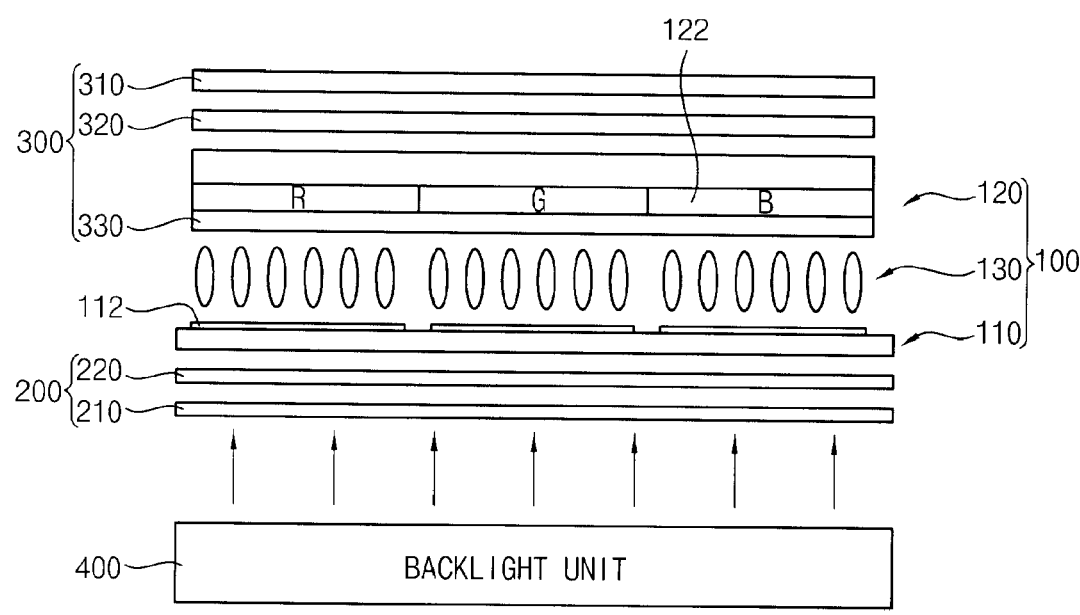
FIG. 11 is a cross-sectional view showing a display device in accordance with a second exemplary embodiment of the present invention.
Figure 12:
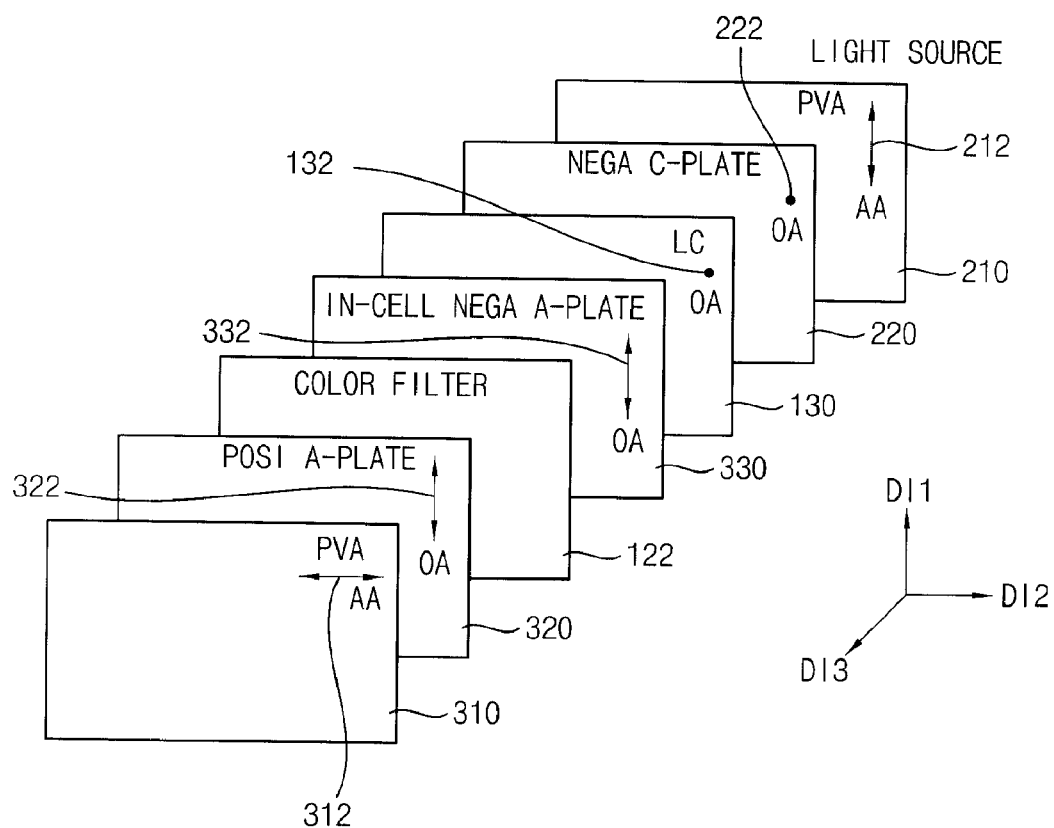
FIG. 12 is a diagram showing a relationship among optical members of the display device shown in FIG. 1.

FIG. 11 is a cross-sectional view showing a display device in accordance with a second exemplary embodiment of the present invention. FIG. 12 is a diagram showing a relationship among optical members of the display device shown in FIG. 11.

Referring to FIG. 11 and FIG. 12, a display device in accordance with the second exemplary embodiment of the present invention includes a display panel 100, a first optical unit 200, a second optical unit 300, and a backlight unit 400.

The display panel 100 includes a first substrate 110, a second substrate 120 facing the first substrate 110, and a liquid crystal layer 130 interposed between the first substrate 110 and the second substrate 120.

The first substrate 110 includes a plurality of signal lines (not shown), a plurality of TFTs (not shown) electrically connected to the signal lines and a plurality of pixel electrodes 112. The pixel electrodes 112 receive data voltages from the signal lines via the TFTs.

The second substrate 120 includes a plurality of color filters 122 corresponding to the pixel electrodes 112 and a common electrode (not shown) formed on the color filters 122. The color filters 122 may include red color filters, green color filters, and blue color filters. The common electrode receives a common voltage. The common electrode may comprise a transparent conductive material.

The liquid crystal layer 130 is disposed between the first substrate 110 and the second substrate 120. The liquid crystal layer 130 may be operated in a vertical alignment mode. That is, when an electric field is not formed between the pixel electrodes 112 and the common electrode, liquid crystal molecules of the liquid crystal layer 130 are aligned in a horizontal direction (i.e., a direction substantially parallel with the first substrate 110). When an electric field is formed between the pixel electrodes 112 and the common electrode, the liquid crystal molecules of the liquid crystal layer 130 are aligned in a vertical direction (i.e., a direction substantially perpendicular to the first substrate 110).

The first optical unit 200 is disposed under the display panel 100. The first optical unit 200 includes a first polarization plate 210 and a C-plate 220. The first polarization plate 210 is disposed under the display panel 100, and the C-plate 220 is disposed between the first polarization plate 210 and the display panel 100. Accordingly, the light generated from the backlight unit 400 disposed under the first polarization plate 210 passes through the first polarization plate 210 and the C-plate 220, and proceeds to the display panel 100.

The second optical unit 300 includes a second polarization plate 310, a positive A-plate 320 and a negative A-plate 330. The second polarization plate 310 is disposed over the display panel 100. The positive A-plate 320 is disposed between the second polarization plate 310 and the display panel 100. The negative A-plate 330 is disposed under the positive A-plate 320 in a proceeding direction of light.

The light having passed through the display panel 100 successively passes through the negative A-plate 330, the positive A-plate 320, and the second polarization plate 310, to display an image. The negative A-plate 330 is disposed under the positive A-plate 320 in the proceeding direction of the light.

In the present exemplary embodiment, the negative A-plate 330 is disposed between the liquid crystal layer 130 and the second substrate 120. For example, the negative A-plate 330 may be formed on the color filters 122 to face the liquid crystal layer 130, and may be formed by a coating method or a dispensing method. The negative A-plate 330 may be formed on the color filters 122 and may substitute an over-coating layer (not shown) that protects the color filters 122. Alternatively, the negative A-plate 330 may be formed on the over-coating layer (not shown).

The C-plate 220 is disposed under the first substrate 110 in FIG. 11, but the C-plate 220 may alternatively be disposed between the first substrate 110 and the liquid crystal layer 130. That is, the C-plate 220 may be formed on the first substrate 110, and may be formed by a coating method or a dispensing method.

The first polarization plate 210 has a first absorption axis 212 substantially parallel with a first direction DI1 and a first polarization axis (not shown) substantially parallel with a second direction DI2 that is substantially perpendicular to the first direction DI1. Light having passed through the first polarization plate 210 is polarized into the second direction DI2. A third direction DI3 represents a proceeding direction of the light, which is substantially perpendicular to each of the first and second directions DI1 and DI2.

The C-plate 220 is disposed over the first polarization plate 210, and has an optical axis 222 substantially parallel with the third direction DI3. The C-plate 220 may be a negative C-plate satisfying a numerical condition of "nx=ny>nz". Herein, "nx" represents a refractive index in an x-axis direction. Further, "ny" represents a refractive index in a y-axis direction, and "nz" represents a refractive index in a z-axis direction. In the present exemplary embodiment, the x-axis direction is substantially parallel with the second direction DI2. Further, the y-axis direction is substantially parallel with the first direction DI1, and the z-axis direction is substantially parallel with the third direction DI3.

An in-plane phase retardation value (Ro) of the C-plate 220 is zero because nx is equal to ny (nx=ny). The in-plane phase retardation value (Ro) of the C-plate 220 is (nx−ny)×d, wherein "d" represents the thickness of the C-plate 220.

A thickness-direction phase retardation value (Rth) of the C-plate 220 is positive because nx and ny are larger than nz (nx=ny>nz). The thickness-direction phase retardation value (Rth) of the C-plate 220 is {(nx+ny)/2−nz}×d.

The liquid crystal layer 130 is disposed over the C-plate 220. The liquid crystal layer 130 may be operated in a vertical alignment mode. The liquid crystal layer 130 may have a refractive index substantially opposite to the refractive index of the C-plate 220. The liquid crystal layer 130 may have an optical axis 132 substantially parallel with the third direction DI3. The direction of the optical axis 132 of the liquid crystal layer 130 may be opposite to the direction of the optical axis 222 of the C-plate 220. The liquid crystal layer 130 may satisfy a numerical condition of "nx=ny<nz".

An in-plane phase retardation value (Ro) of the liquid crystal layer 130 is zero because nx is equal to ny (nx=ny). A thickness-direction phase retardation value (Rth) of the liquid crystal layer 130 is negative because nx and ny are smaller than nz (nx=ny<nz). The thickness-direction phase retardation value (Rth) of the liquid crystal layer 130 is {(nx+ny)/2−nz}×d, wherein "d" represents the thickness of the liquid crystal layer 130.

The negative A-plate 330 is disposed over the liquid crystal layer 130, and has an optical axis 332 substantially parallel with the first direction DI1. That is, the optical axis 332 of the negative A-plate 330 may be substantially parallel with the first absorption axis 212 of the first polarization plate 210. The optical axis 332 of the negative A-plate 330 is one of nx and ny, which has a refractive index smaller than that of the other. That is, the optical axis 332 represents a fast axis.

The negative A-plate 330 may be a phase retardation film whose thickness-direction phase retardation value (Rth) satisfies a numerical condition of Rth≦0 and nx≠ny. The thickness-direction phase retardation value (Rth) of the negative A-plate 330 is {(nx+ny)/2−nz}×d, wherein "d" represents the thickness of the negative A-plate 330.

The color filters 122 are disposed over the negative A-plate 330. The color filters 122 change white light to colored light such as red light, green light, blue light, etc. For example, the color filters 122 transmit one of the red light, green light, and blue light that are included in the white light.

The positive A-plate 320 is disposed over the color filters 122. The positive A-plate 320 has an optical axis 322 substantially parallel with the first direction DI1. That is, the optical axis 322 of the positive A-plate 320 may be substantially parallel with the first absorption axis 212 of the first polarization plate 210. The optical axis 332 of the negative A-plate 330 is one of nx and ny, which has a refractive index larger than that of the other. That is, the optical axis 332 represents a slow axis.

The positive A-plate 320 may be a phase retardation film whose thickness-direction phase retardation value (Rth) satisfies a numerical condition of Rth≧0 and nx≠ny. The thickness-direction phase retardation value (Rth) of the positive A-plate 320 is {(nx+ny)/2−nz}×d, wherein "d" represents the thickness of the positive A-plate 320.

The second polarization plate 310 is disposed over the negative A-plate 330. The second polarization plate 310 has a second absorption axis 312 substantially parallel with the second direction DI2 and a second polarization axis (not shown) substantially parallel with the first direction DI1.

Figure 13:
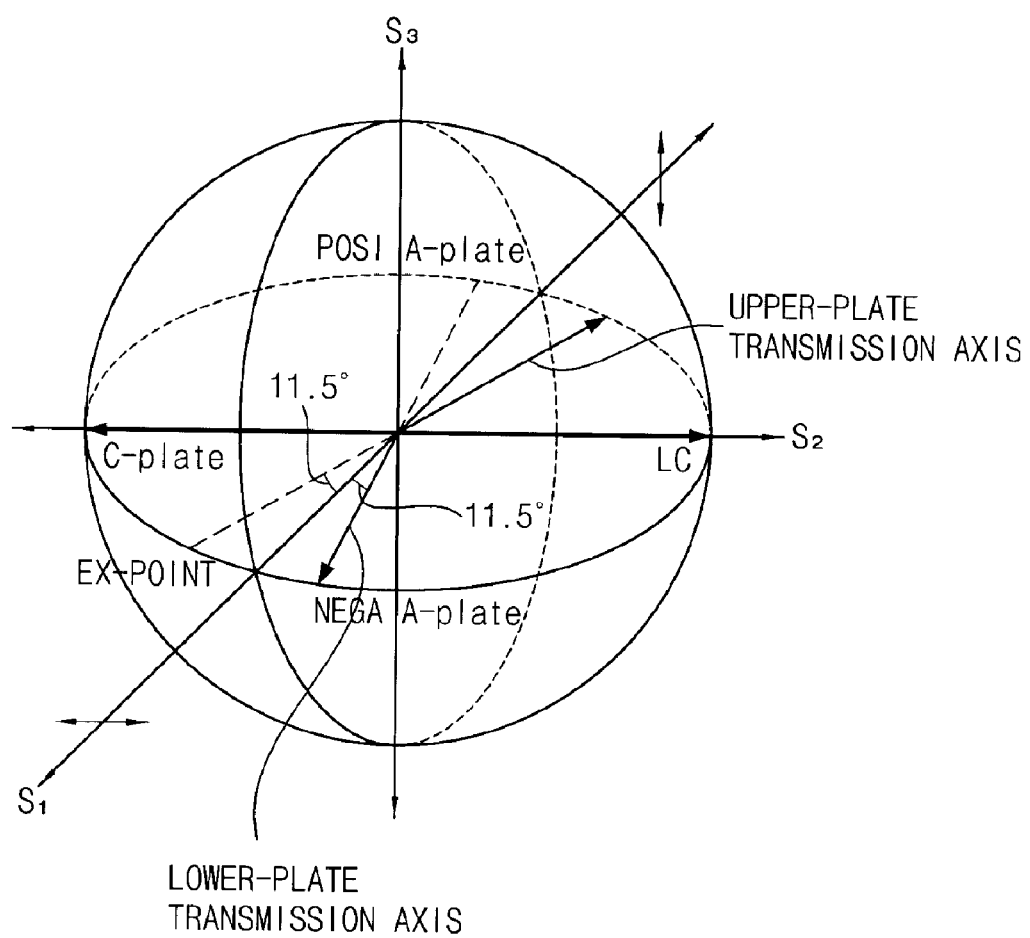
FIG. 13 is a graph showing a relationship between the absorption axis and the optical axis of the optical members in FIG. 12.

FIG. 13 is a graph showing a relationship between the absorption axis and the optical axis of the optical members in FIG. 12.

Referring to FIG. 12 and FIG. 13, a Poincare sphere has three coordinate axes including a first coordinate axis S1, a second coordinate axis S2, and a third coordinate axis S3. The Poincare sphere is a sphere for stereoscopically describing a state of polarization in a side view of the display device. For example, the Poincare sphere shown in FIG. 13 shows a state of polarization when an observer views the display device at an azimuth angle of about 45 degrees and a polar angle of about 60 degrees with respect to the plane of the display device.

The optical axis 132 of the liquid crystal layer 130 is an axis of rotation directed to a direction of the second coordinate axis S2, and the optical axis 222 of the C-plate 220 is an axis of rotation directed to an opposite direction of the second coordinate axis S2.

The first polarization axis of the first polarization plate 210 (i.e., a lower-plate transmission axis) is placed on a plane formed by the first and second coordinate axes S1 and S2. The first polarization axis is inclined at about 11.5 degrees in a counterclockwise direction with respect to the first coordinate axis S1.

The second polarization axis of the second polarization plate 310 (i.e., an upper-plate transmission axis) is placed on the plane formed by the first and second coordinate axes S1 and S2. The upper-plate transmission axis and the lower-plate transmission axis are symmetric with respect to the second coordinate axis S2.

The optical axis 332 of the negative A-plate (NEGA A-plate) 330 is an axis of rotation placed on the plane formed by the first and second coordinate axes S1 and S2. The optical axis 332 of the negative A-plate (NEGA A-plate) 330 may be directed to substantially the same direction as the direction of the lower-plate transmission axis.

The optical axis 322 of the positive A-plate (POSI A-plate) 320 is an axis of rotation placed on the plane formed by the first and second coordinate axes S1 and S2. The optical axis 322 of the positive A-plate 320 may be directed to a direction substantially opposite to the direction of the optical axis 332 of the negative A-plate (POSI A-plate) 330.

An extinction point (EX-POINT) of the Poincare sphere may be formed in a direction opposite to the second polarization axis of the second polarization plate 310 (i.e., the upper-plate transmission axis). The extinction point (EX-POINT) is a point corresponding to an ideal polarization state of light passing from the first polarization plate 210 to the positive A-plate 320. When the polarization state of the light passing from the first polarization plate 210 to the positive A-plate 320 coincides with the extinction point (EX-POINT), a contrast ratio (CR) in the side view of the display device may be the maximum.

Figure 14:
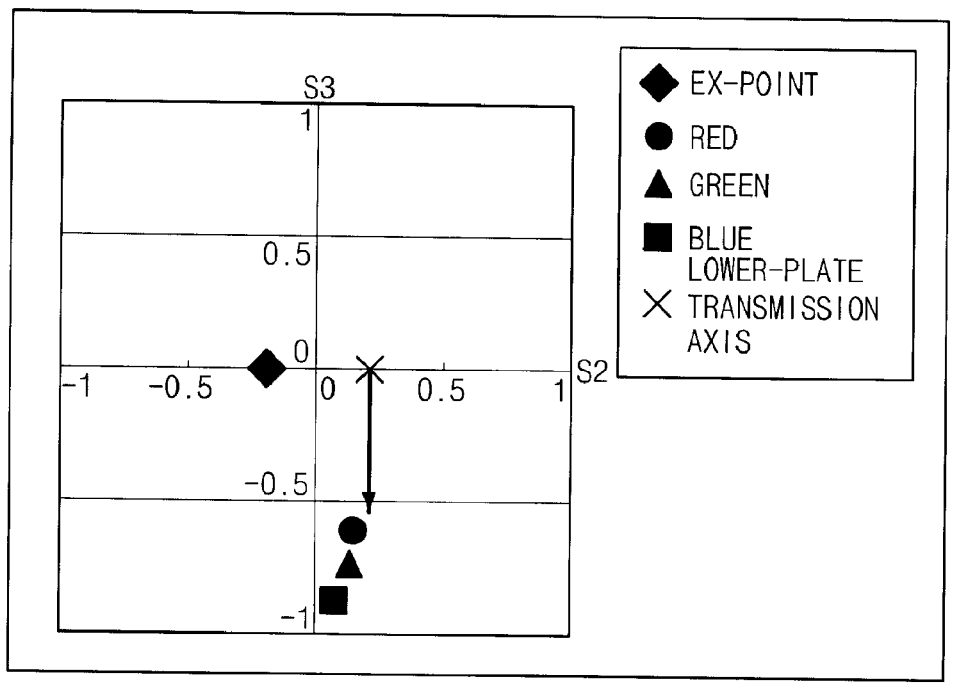
FIG. 14 is a graph showing a polarization state after light passes through the C-plate shown in FIG. 12 using a Poincare plane.

FIG. 14 is a graph showing a polarization state after light passes through the C-plate shown in FIG. 12 using a Poincare plane.

Referring to FIG. 12, FIG. 13, and FIG. 14, the Poincare plane in FIG. 14 is a plan view of the Poincare sphere in view of the first coordinate axis S1. That is, the Poincare plane is formed by the second and third coordinate axes S2 and S3.

When the light passes through the first polarization plate 210, polarization states of red light, green light, and blue light are placed on the second coordinate axis S2 of the Poincare plane. The polarization states of the red light, the green light, and the blue light having passed through the first polarization plate 210 are separated from the center of the Poincare plane to a right side along the second coordinate axis S2. The extinction point is separated from the center of the Poincare plane to a left side along the second coordinate axis S2.

When the light having passed through the first polarization plate 210 passes through the C-plate 220, the polarization states of the red light, the green light, and the blue light move downward along the third coordinate axis S3 by a first distance. The polarization states of the color light may be dispersed.

Figure 15:
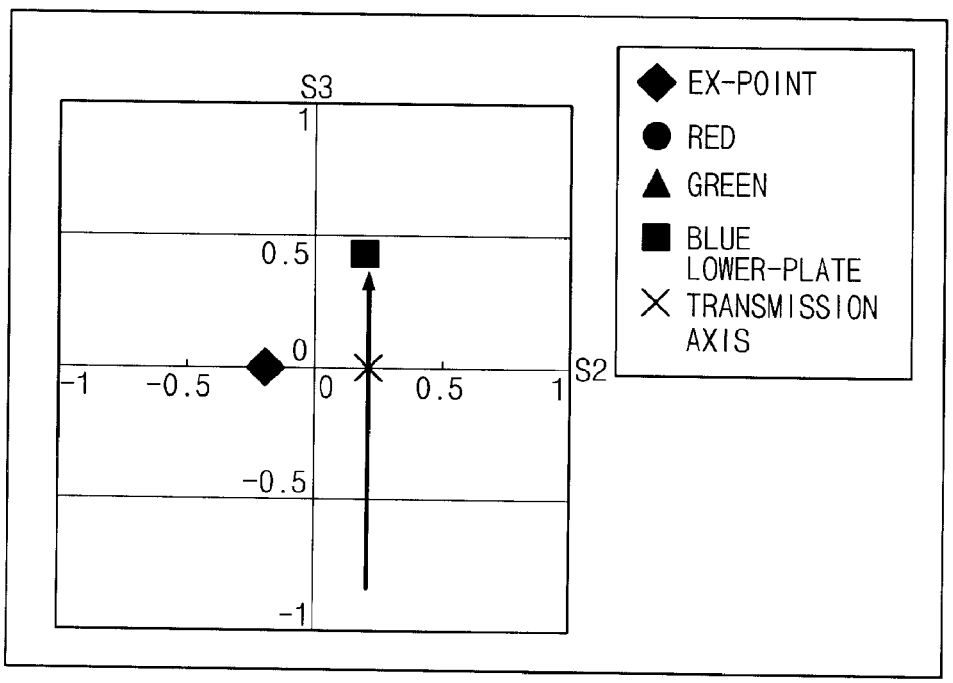
FIG. 15 is a graph showing a polarization state after light passes through the liquid crystal layer shown in FIG. 12 using a Poincare plane.

FIG. 15 is a graph showing a polarization state after light passes through the liquid crystal layer shown in FIG. 12 using the Poincare plane.

Referring to FIG. 12 and FIG. 15, the red light, the green light, and the blue light further pass through the liquid crystal layer 130 after having passed through the C-plate 220. The polarization states of the colored light having passed through the liquid crystal layer 130 move upward along the third coordinate axis S3 by a second distance. The second distance may be larger than the first distance. Accordingly, the polarization states of the colored light having passed through the liquid crystal layer 130 may be placed at an upper position with respect to the second coordinate axis S2. The polarization states of the colored light may be gathered further than the case when the light passes through the C-plate 220.

Figure 16:
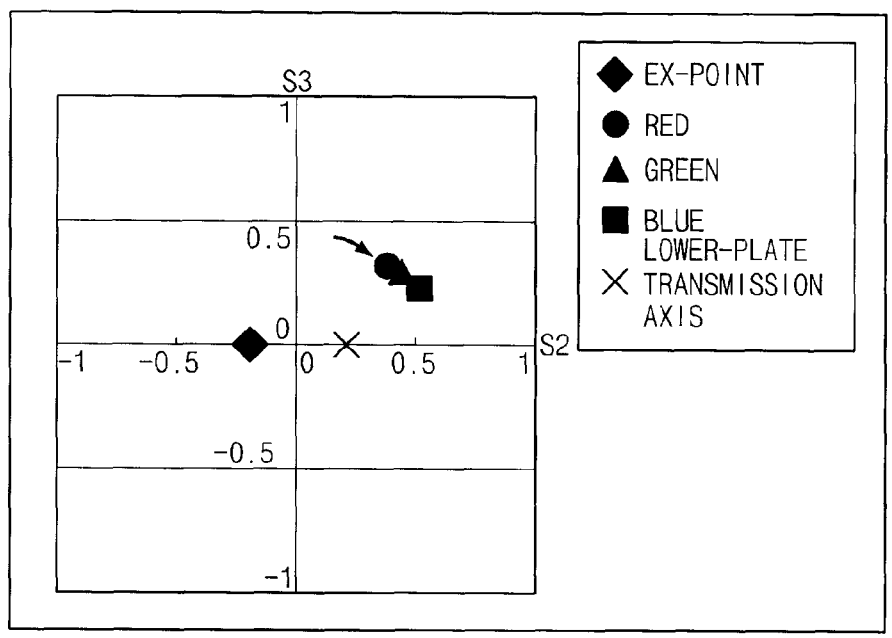
FIG. 16 is a graph showing a polarization state after light passes through the positive A-plate shown in FIG. 12 using a Poincare plane.

FIG. 16 is a graph showing a polarization state after light passes through the positive A-plate shown in FIG. 12 using the Poincare plane.

Referring to FIG. 12 and FIG. 16, the red light, the green light, and the blue light further pass through the negative A-plate 330 after having passed through the liquid crystal layer 130. The polarization states of the colored light having passed through the negative A-plate 330 rotate clockwise with respect to the optical axis 332 of the negative A-plate 330, and move by a third distance. The polarization states of the color light may be dispersed further than the case when the light passes through the liquid crystal layer 130.

The red light, the green light, and the blue light further pass through the color filter 122 after having passed through the negative A-plate 330. The color filter 122 selectively transmits only one of the red light, the green light, and the blue light.

Figure 17:
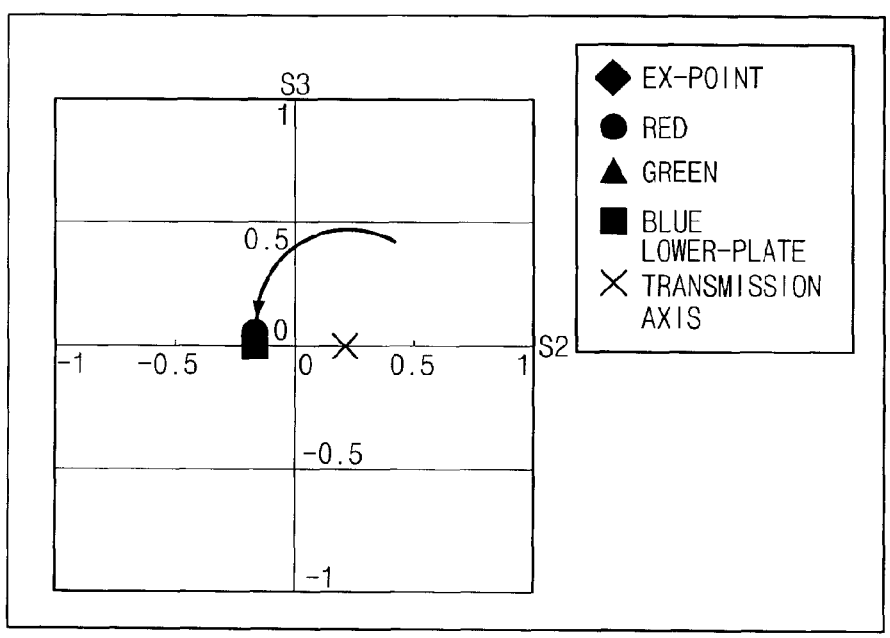
FIG. 17 is a graph showing a polarization state after light passes through the negative A-plate shown in FIG. 12 using a Poincare plane.

FIG. 17 is a graph showing a polarization state after light passes through the negative A-plate shown in FIG. 12 using the Poincare plane.

Referring to FIG. 12 and FIG. 17, the red light, the green light, and the blue light further pass through the positive A-plate 320 after having passed through the negative A-plate 330. The polarization states of the colored light having passed through the positive A-plate 320 rotate counterclockwise by a fourth distance with respect to the positive A-plate 320, to be disposed adjacent to the extinction point. The fourth distance may be smaller than the third distance. The polarization states of the color light dispersed by the negative A-plate 330 may be gathered into the extinction point by the positive A-plate 320.

As described above, the polarization states of the colored light having passed through the positive A-plate 320 may be gathered into the extinction point of the Poincare sphere. That is, the polarization states of the colored light may substantially coincide with the extinction point. Accordingly, the contrast ratio in the side view of the display device may be increased.

Figure 18:
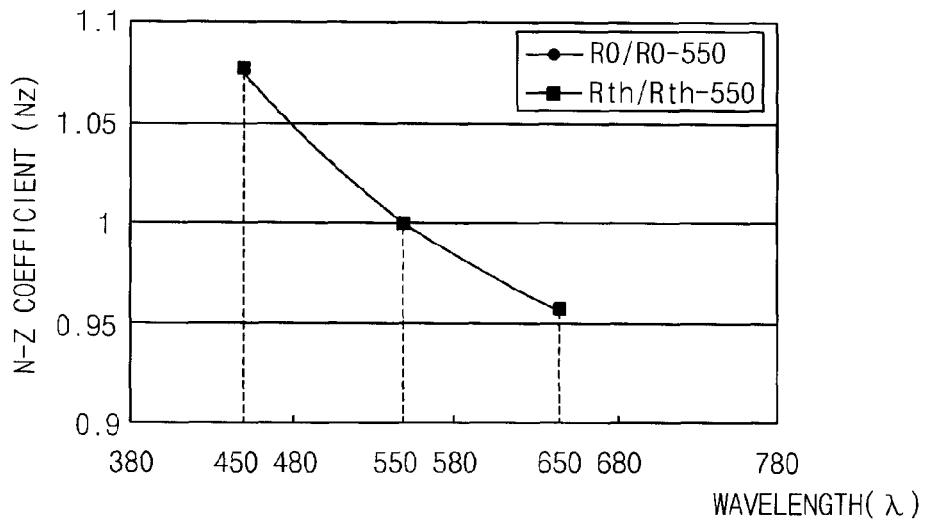
FIG. 18 is a graph showing characteristics of the negative A-plate shown in FIG. 12.

FIG. 18 is a graph showing characteristics of the negative A-plate shown in FIG. 12.

Referring to FIG. 18, an N-Z coefficient (Nz) of the negative A-plate 330 may be in a range of about −0.9 to about −1.1, and may be about −1.0. The N-Z coefficient (Nz) is "−|(nx−nz)/(nx−ny)|".

In the present exemplary embodiment, an in-plane phase retardation value (Ro) in a wavelength range of green light may be in a range of about 47.0 nm to about 49.0 nm, and may be about 47.8 nm. The wavelength range of green light is from about 540 nm to about 560 nm, and the wavelength of green light is approximately 550 nm.

A first negative in-plane dispersion retardation value is defined as a ratio of an in-plane phase retardation value (Ro) in a wavelength range of blue light to the in-plane phase retardation value (Ro) in the wavelength range of green light. The first negative in-plane dispersion retardation value may be in a range of about 1.00 to about 1.20, and may be about 1.08. The wavelength range of blue light is from about 440 nm to about 460 nm, and the wavelength of blue light is approximately 450 nm.

A second negative in-plane dispersion retardation value is defined as a ratio of an in-plane phase retardation value (Ro) in a wavelength range of red light to the in-plane phase retardation value (Ro) in the wavelength range of green light. The second negative in-plane dispersion retardation value may be in a range of about 0.90 to about 1.10, and may be about 0.96. The wavelength range of red light is from about 640 nm to about 660 nm, and the wavelength of red light is approximately 650 nm.

In the present exemplary embodiments, a thickness-direction phase retardation value (Rth) in the wavelength range of green light may be in a range of about −23.0 nm to about −25.0 nm, and may be about −23.9 nm.

A first negative thickness-direction dispersion retardation value is defined as a ratio of a thickness-direction phase retardation value (Rth) in a wavelength range of blue light to the thickness-direction phase retardation value (Rth) in the wavelength range of green light. The first negative thickness-direction dispersion retardation value may be substantially the same as the first negative in-plane dispersion retardation value.

A second negative thickness-direction dispersion retardation value is defined as a ratio of a thickness-direction phase retardation value (Rth) in a wavelength range of red light to the thickness-direction phase retardation value (Rth) in the wavelength range of green light. The second negative thickness-direction dispersion retardation value may be substantially the same as the second negative in-plane dispersion retardation value.

Figure 19:
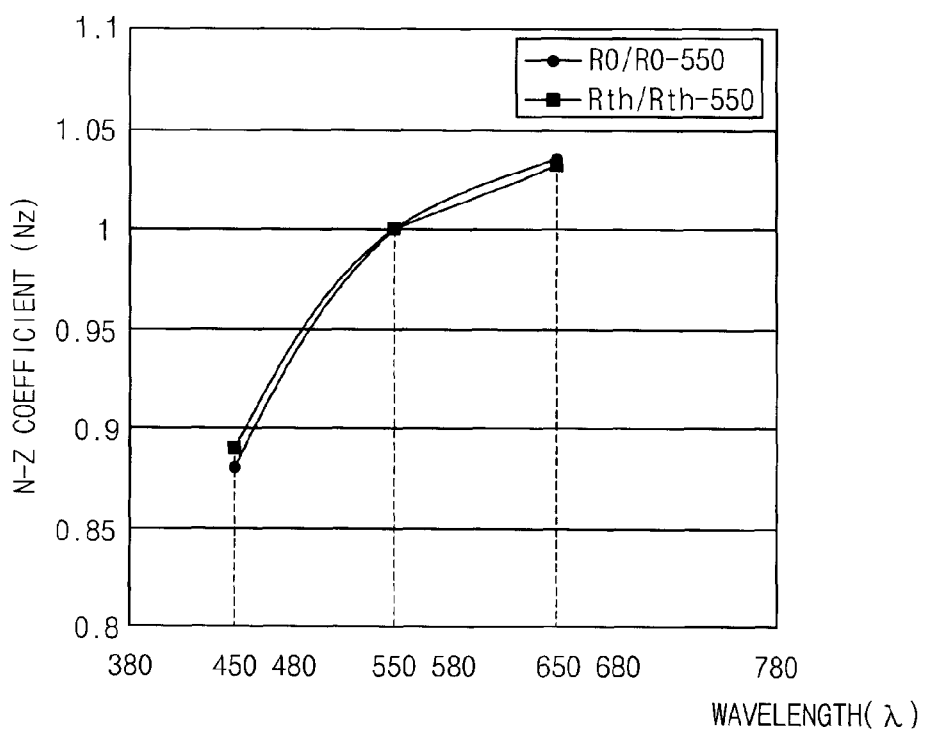
FIG. 19 is a graph showing characteristics of the positive A-plate shown in FIG. 12.

FIG. 19 is a graph showing characteristics of the positive A-plate shown in FIG. 12.

Referring to FIG. 19, an N-Z coefficient (Nz) of the positive A-plate 320 may be in a range of about 0.9 to about 1.1, preferably, may be about 1.04. The N-Z coefficient (Nz) is "|(nx−nz)/(nx−ny)|".

In the present exemplary embodiment, an in-plane phase retardation value (Ro) in a wavelength range of green light may be in a range of about 179.5 nm to about 180.5 nm, and may be about 180 nm. The wavelength range of green light is from about 540 nm to about 560 nm, and the wavelength of green light is approximately 550 nm.

A first positive in-plane dispersion retardation value is defined as a ratio of an in-plane phase retardation value (Ro) in a wavelength range of blue light to the in-plane phase retardation value (Ro) in the wavelength range of green light. The first positive in-plane dispersion retardation value may be in a range of about 0.880 to about 0.890, and may be about 0.885. The wavelength range of blue light is from about 440 nm to about 460 nm, and the wavelength of blue light is approximately 450 nm.

A second positive in-plane dispersion retardation value is defined as a ratio of an in-plane phase retardation value (Ro) in a wavelength range of red light to the in-plane phase retardation value (Ro) in the wavelength range of green light. The second positive in-plane dispersion retardation value may be in a range of about 1.000 to about 1.100, and may be about 1.038. The wavelength range of red light is from about 640 nm to about 660 nm, and the wavelength of red light is approximately 650 nm.

In the present exemplary embodiment, a thickness-direction phase retardation value (Rth) in the wavelength range of green light may be in a range of about 96.0 nm to about 98.0 nm, and may be about 96.7 nm.

A first positive thickness-direction dispersion retardation value is defined as a ratio of a thickness-direction phase retardation value (Rth) in a wavelength range of blue light to the thickness-direction phase retardation value (Rth) in the wavelength range of green light. The first positive thickness-direction dispersion retardation value may be substantially the same as the first positive in-plane dispersion retardation value.

A second positive thickness-direction dispersion retardation value is defined as a ratio of a thickness-direction phase retardation value (Rth) in a wavelength range of red light to the thickness-direction phase retardation value (Rth) in the wavelength range of green light. The second positive thickness-direction dispersion retardation value may be substantially the same as the second positive in-plane dispersion retardation value.

When an absolute value of each N-Z coefficient (Nz) of the negative A-plate and the positive A-plate is in a range of about 0.9 to about 1.1, the negative A-plate and the positive A-plate may satisfy the following conditions of phase retardation.

When a positive red wavelength-retardation value is defined as a ratio of the in-plane phase retardation value (Ro) of the positive A-plate to a wavelength (λ) of red light, and a negative red wavelength-retardation value is defined as a ratio of the in-plane phase retardation value (Ro) of the negative A-plate to the wavelength (λ) of the red light, a subtraction of the negative red wavelength-retardation value from the positive red wavelength-retardation value may be in a range of about 0.20 to about 0.30, and may be about 0.25. The wavelength of red light may be in a range of about 640 nm to about 660 nm, and may be 650 nm.

When a positive green wavelength-retardation value is defined as a ratio of the in-plane phase retardation value (Ro) of the positive A-plate to a wavelength (λ) of green light, and a negative green wavelength-retardation value is defined as a ratio of the in-plane phase retardation value (Ro) of the negative A-plate to the wavelength (λ) of the green light, a difference between the negative green wavelength-retardation value and the positive green wavelength-retardation value may be in a range of about 0.20 to about 0.30, and may be about 0.25. The wavelength of green light may be in a range of about 540 nm to about 560 nm, and maybe 550 nm.

When a positive blue wavelength-retardation value is defined as a ratio of the in-plane phase retardation value (Ro) of the positive A-plate to a wavelength (λ) of blue light, and a negative blue wavelength-retardation value is defined as a ratio of the in-plane phase retardation value (Ro) of the negative A-plate to the wavelength (λ) of the blue light, a difference between the negative blue wavelength-retardation value and the positive blue wavelength-retardation value may be in a range of about 0.20 to about 0.30, and may be about 0.25. The wavelength of blue light may be in a range of about 440 nm to about 460 nm, and may be 450 nm.

Figure 20:
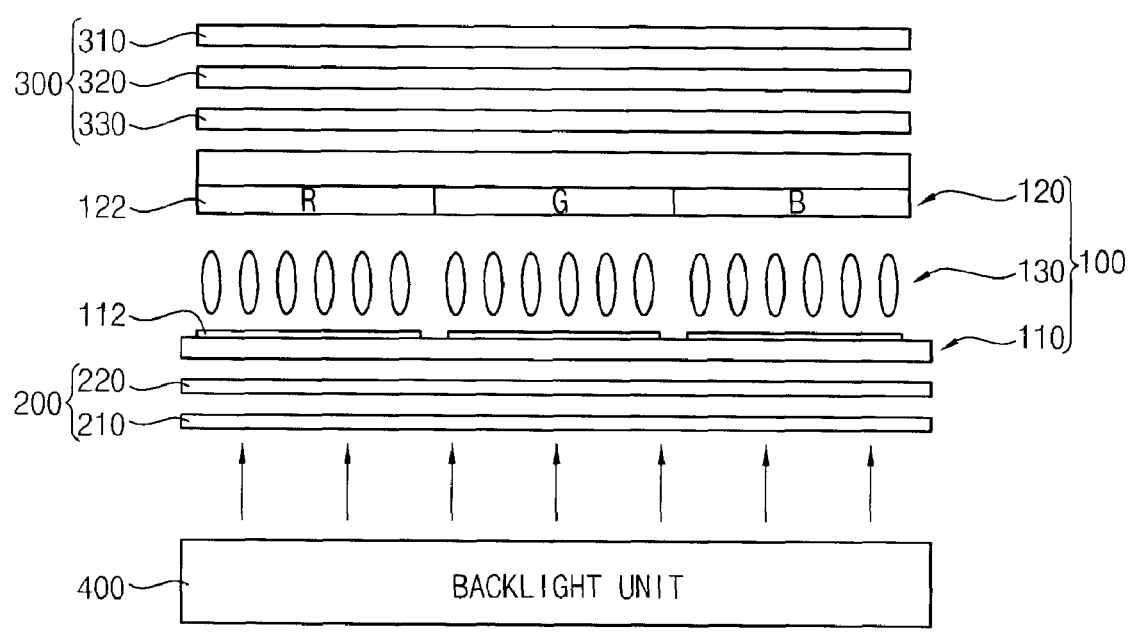
FIG. 20 is a cross-sectional view showing a display device in accordance with a third exemplary embodiment of the present invention.

FIG. 20 is a cross-sectional view showing a display device in accordance with a third exemplary embodiment of the present invention.

The display device shown in FIG. 20 may have substantially the same structure as the display device described with reference to FIG. 11 except that a negative A-plate 330 is disposed between a second substrate 120 and a positive A-plate 320. Thus, the same reference number is used at the same or similar element, and any further descriptions concerning the same or similar elements as those described in FIG. 11 will be omitted.

Referring to FIG. 20, a negative A-plate 330 in accordance with the third exemplary embodiment of the present invention is disposed between the second substrate 120 and the positive A-plate 320. That is, the negative A-plate 330 is not disposed between the liquid crystal layer 130 and the color filters 122, but disposed over the display panel 100. The negative A-plate 330 may be attached to an upper surface of the second substrate 120 in a form of a film.

As described above, the polarization states of the red light, the green light, and the blue light having passed through the C-plate 220 and the liquid crystal layer 130 are dispersed in the side view of the display device, and do not coincide with each other. However, the positive and negative A-plates 320 and 330 in accordance with the present exemplary embodiment of the present invention may gather the dispersed polarization states of the colored light.

Accordingly, the polarization states of the colored light substantially coincide with the extinction point of the Poincare sphere by the positive and negative A-plates 320 and 330. Therefore, the contrast ratio in the side view of the display device may be increased, and a side viewing angle of the display device may be increased.

It will be apparent to those skilled in the art that various modifications and variation can be made in the present invention without departing from the spirit or scope of the inven-

What is claimed is:

1. A display device, comprising:
a display panel comprising a first substrate, a second substrate, and a liquid crystal layer disposed between the first substrate and the second substrate, the liquid crystal layer being vertically aligned;
a first optical unit comprising a C-plate and a first polarization plate having a first absorption axis; and
a second optical unit comprising a positive A-plate, a negative A-plate disposed over the positive A-plate in a proceeding direction of light, and a second polarization plate having a second absorption axis substantially perpendicular to the first absorption axis,
wherein the negative A-plate is a phase retardation film having a thickness-direction phase retardation value (Rth) that satisfies a numerical condition of $Rth \leqq 0$ and $nx \neq ny$, the positive A-plate is a phase retardation film having the thickness-direction phase retardation value (Rth) that satisfies a numerical condition of $Rth \geqq 0$ and $nx \neq ny$, and the C-plate is a negative C-plate satisfying a numerical condition of "$nx=ny>nz$,";
wherein $Rth=\{(nx+ny)/2-nz\} \times d$, and "d" is a thickness of the phase retardation film;
"nx" represents a refractive index in an x-axis direction, and "ny" represents a refractive index in a y-axis direction substantially perpendicular to the x-axis; and
"nz" represents a refractive index in a z-axis direction substantially perpendicular to the x-axis direction and the y-axis direction.

2. The display device of claim 1, wherein the first optical unit is disposed under the display panel in the proceeding direction of the light, and the second optical unit is disposed over the display panel in the proceeding direction of the light.

3. The display device of claim 1, wherein the first optical unit is disposed over the display panel in the proceeding direction of the light, and the second optical unit is disposed under the display panel in the proceeding direction of the light.

4. The display device of claim 1, wherein the C-plate is disposed between the display panel and the first polarization plate, and the positive A-plate and the negative A-plate are disposed between the display panel and the second polarization plate.

5. The display device of claim 1, wherein one axis of an x-axis and a y-axis of the negative A-plate is substantially perpendicular to the second absorption axis of the second polarization plate, and a refractive index in a direction of the axis substantially perpendicular to the second absorption axis is smaller than a refractive index in a direction of the other axis of the x-axis and the y-axis, and
wherein one axis of an x-axis and a y-axis of the positive A-plate is substantially parallel with the second absorption axis, and a refractive index in a direction of the axis substantially parallel with the second absorption axis is larger than a refractive index in a direction of the other axis of the x-axis and the y-axis.

6. The display device of claim 1, wherein an in-plane phase retardation value (Ro) and a thickness-direction phase retardation value (Rth) of the negative A-plate is asymmetric with an in-plane phase retardation value (Ro) and the thickness-direction phase retardation value (Rth) of the positive A-plate, and wherein $Ro=(nx-ny) \times d$, and "d" is a thickness of the phase retardation film; and
"nx" represents a refractive index in an x-axis direction, and "ny" represents a refractive index in a y-axis direction substantially perpendicular to the x-axis.

7. The display device of claim 6, wherein a ratio ($Ro\_r/\lambda\_r$) of the in-plane phase retardation value ($Ro\_r$) of the negative A-plate to a wavelength ($\lambda\_r$) of red light is in a range of 0.093 to 0.173, and a ratio ($Rth\_r/\lambda\_r$) of the thickness-direction phase retardation value ($Rth\_r$) of the negative A-plate to the wavelength ($\lambda\_r$) of the red light is in a range of 0.073 to 0.153,
wherein a ratio ($Ro\_g/\lambda\_g$) of the in-plane phase retardation value ($Ro\_g$) of the negative A-plate to a wavelength ($\lambda\_g$) of green light is in a range of 0.108 to 0.188, and a ratio ($Rth\_g/\lambda\_g$) of the thickness-direction phase retardation value ($Rth\_g$) of the negative A-plate to the wavelength ($\lambda\_g$) of the green light is in a range of 0.086 to 0.166,
wherein a ratio ($Ro\_b/\lambda\_b$) of the in-plane phase retardation value ($Ro\_b$) of the negative A-plate to a wavelength ($\lambda\_b$) of blue light is in a range of 0.140 to 0.220, and a ratio ($Rth\_b/\lambda\_b$) of the thickness-direction phase retardation value ($Rth\_b$) of the negative A-plate to the wavelength ($\lambda\_b$) of the blue light is in a range of 0.113 to 0.193.

8. The display device of claim 6, wherein a ratio ($Ro\_r/\lambda\_r$) of the in-plane phase retardation value ($Ro\_r$) of the positive A-plate to a wavelength ($\lambda\_r$) of red light is in a range of 0.133 to 0.213, and a ratio ($Rth\_r/\lambda\_r$) of the thickness-direction phase retardation value ($Rth\_r$) of the positive A-plate to the wavelength ($\lambda\_r$) of the red light is in a range of 0.107 to 0.187,
wherein a ratio ($Ro\_g/\lambda\_g$) of the in-plane phase retardation value ($Ro\_g$) of the positive A-plate to the wavelength ($\lambda\_g$) of green light is in a range of 0.152 to 0.232, and a ratio ($Rth\_g/\lambda\_g$) of the thickness-direction phase retardation value ($Rth\_g$) of the positive A-plate to the wavelength ($\lambda\_g$) of the green light is in a range of 0.124 to 0.204,
wherein a ratio ($Ro\_b/\lambda\_b$) of the in-plane phase retardation value ($Ro\_b$) of the positive A-plate to a wavelength ($\lambda\_b$) of blue light is in a range of 0.194 to 0.274, and a ratio ($Rth\_b/\lambda\_b$) of the thickness-direction phase retardation value ($Rth\_b$) of the positive A-plate to the wavelength ($\lambda\_b$) of the blue light is in a range of 0.159 to 0.239.

9. The display device of claim 1, wherein an absolute value of a thickness-direction phase retardation value (Rth) of the C-plate is smaller than an absolute value of a thickness-direction phase retardation value (Rth) of the liquid crystal layer,
wherein $Rth=\{(nx+ny)/2-nz\} \times d$, and "d" is a thickness of the C-plate;
"nx" represents a refractive index in an x-axis direction, and "ny" represents a refractive index in a y-axis direction substantially perpendicular to the x-axis; and
"nz" represents a refractive index in a z-axis direction substantially perpendicular to the x-axis direction and the y-axis direction.

10. The display device of claim 1, wherein a ratio (B) of the difference between the thickness-direction phase retardation values of the liquid crystal layer and the C-plate related to a wavelength of blue light is larger than a ratio (G) of the difference between the thickness-direction phase retardation values of the liquid crystal layer and the C-plate related to a wavelength of green light, and a ratio (G) of the difference between the thickness-direction phase retardation values of the liquid crystal layer and the C-plate related to the wavelength of the green light is larger than a ratio (R) of the difference between the thickness-direction phase retardation values of the liquid crystal layer and the C-plate related to a wavelength of red light.

11. The display device of claim 10, wherein the ratio (R) of the difference between the thickness-direction phase retardation values of the liquid crystal layer and the C-plate related to the wavelength of the red light is in a range of 0.01 to 0.08,
wherein the ratio (G) of the difference between the thickness-direction phase retardation values of the liquid crystal layer and the C-plate related to the wavelength of the green light is in a range of 0.05 to 0.135,
wherein the ratio (B) of the difference between the thickness-direction phase retardation values of the liquid crystal layer and the C-plate related to the wavelength of the blue light is in a range of 0.145 to 0.230.

12. The display device of claim 1, wherein the positive A-plate and the negative A-plate gather polarization states of the red light, the green light, and the blue light into an extinction point of a Poincare sphere, the polarization states of the red light, the green light, and the blue light being first dispersed by the C-plate and the liquid crystal layer.

13. A display device, comprising:
a display panel comprising a first substrate, a second substrate, and a liquid crystal layer disposed between the first substrate and the second substrate, the liquid crystal layer being vertically aligned;
a first optical unit comprising:
a first polarization plate disposed under the first substrate, the first polarization plate having a first absorption axis; and
a C-plate disposed between the first polarization plate and the first substrate; and
a second optical unit comprising:
a second polarization plate disposed over the second substrate, the second polarization plate having a second absorption axis substantially perpendicular to the first absorption axis;
a positive A-plate disposed between the second polarization plate and the second substrate; and
a negative A-plate disposed under the positive A-plate in a proceeding direction of light,
wherein the negative A-plate is a phase retardation film having a thickness-direction phase retardation value (Rth) that satisfies a numerical condition of Rth$\leq$0 and nx$\neq$ny, and the positive A-plate is a phase retardation film having a thickness-direction phase retardation value (Rth) that satisfies a numerical condition of Rth$\geq$0 and nx$\neq$ny, and
wherein Rth=$\{(nx+ny)/2-nz\} \times d$, and "d" is a thickness of the phase retardation film;
"nx" represents a refractive index in an x-axis direction, and "ny" represents a refractive index in a y-axis direction substantially perpendicular to the x-axis; and
"nz" represents a refractive index in a z-axis direction substantially perpendicular to the x-axis direction and the y-axis direction.

14. The display device of claim 13, wherein the negative A-plate is disposed between the liquid crystal layer and the second substrate.

15. The display device of claim 14, wherein the second substrate comprises a plurality of color filters facing the liquid crystal layer, and the negative A-plate is disposed on the color filters to face the liquid crystal layer.

16. The display device of claim 13, wherein the negative A-plate is disposed between the second substrate and the positive A-plate.

17. The display device of claim 13, wherein one axis of an x-axis and a y-axis of the negative A-plate is substantially parallel with the first absorption axis of the first polarization plate, and a refractive index in a direction of the axis substantially parallel with the first absorption axis is smaller than a refractive index in a direction of the other axis of the x-axis and the y-axis, and
wherein one axis of an x-axis and a y-axis of the positive A-plate is substantially parallel with the first absorption axis, and a refractive index in a direction of the axis substantially parallel with the first absorption axis is larger than a refractive index in a direction of the other axis of the x-axis and the y-axis.

18. The display device of claim 13, wherein an absolute value of an N-Z coefficient (Nz) of the negative A-plate is in a range of 0.9 to 1.1, and an absolute value of an N-Z coefficient (Nz) of the positive A-plate is in a range of 0.9 to 1.1, and
wherein Nz=(nx−nz)/(nx−ny);
"nx" represents a refractive index in an x-axis direction, and "ny" represents a refractive index in a y-axis direction substantially perpendicular to the x-axis; and
"nz" represents a refractive index in a z-axis direction substantially perpendicular to the x-axis direction and the y-axis direction.

19. The display device of claim 18, wherein an in-plane phase retardation value (Ro) of the negative A-plate in a wavelength range of green light is in a range of 47.0 nm to 49.0 nm, and
wherein a first negative in-plane dispersion retardation value of the negative A-plate is in a range of 1.00 to 1.20, and the first negative in-plane dispersion retardation value is a ratio of an in-plane phase retardation value (Ro) in a wavelength range of blue light to the in-plane phase retardation value (Ro) in the wavelength range of green light, and
wherein a second negative in-plane dispersion retardation value of the negative A-plate is in a range of 0.90 to 1.10, and the second negative in-plane dispersion retardation value is a ratio of an in-plane phase retardation value (Ro) in a wavelength range of red light to the in-plane phase retardation value (Ro) in the wavelength range of green light,
wherein Ro=(nx−ny)×d;
"nx" represents a refractive index in an x-axis direction, and "ny" represents a refractive index in a y-axis direction substantially perpendicular to the x-axis; and
"d" is a thickness of the negative A-plate.

20. The display device of claim 19, wherein a thickness-direction phase retardation value (Rth) of the negative A-plate in a wavelength range of green light is in a range of −23.0 nm to −25.0 nm, and
wherein a first negative thickness-direction dispersion retardation value of the negative A-plate is substantially the same as the first negative in-plane dispersion retardation value of the negative A-plate, and the first negative thickness-direction dispersion retardation value is a ratio of an thickness-direction phase retardation value (Rth) in a wavelength range of blue light to the thickness-direction phase retardation value (Rth) in the wavelength range of green light, and
wherein a second negative thickness-direction dispersion retardation value of the negative A-plate is substantially the same as the second negative in-plane dispersion retardation value of the negative A-plate, and the second negative thickness-direction dispersion retardation value is a ratio of an thickness-direction phase retardation value (Rth) in a wavelength range of red light to the thickness-direction phase retardation value (Rth) in the wavelength range of green light.

21. The display device of claim 20, wherein the wavelength range of the red light is in a range of 640 nm to 660 nm, the wavelength range of the green light is in a range of 540 nm to 560 nm, and the wavelength range of the blue light is in a range of 440 nm to 460 nm.

22. The display device of claim 18, wherein an in-plane phase retardation value (Ro) of the positive A-plate in a wavelength range of green light is in a range of 179.5 nm to 180.5 nm, and wherein a first positive in-plane dispersion retardation value of the positive A-plate is in a range of 0.880 to 0.890, and the first positive in-plane dispersion retardation value is a ratio of an in-plane phase retardation value (Ro) in a wavelength range of blue light to the in-plane phase retardation value (Ro) in the wavelength range of green light, and wherein a second positive in-plane dispersion retardation value of the positive A-plate is in a range of 1.000 to 1.100, and the second positive in-plane dispersion retardation value is a ratio of an in-plane phase retardation value (Ro) in a wavelength range of red light to the in-plane phase retardation value (Ro) in the wavelength range of green light, wherein Ro=(nx−ny)×d;

"nx" represents a refractive index in an x-axis direction, and "ny" represents a refractive index in a y-axis direction substantially perpendicular to the x-axis; and "d" is a thickness of the positive A-plate.

23. The display device of claim 22, wherein a thickness-direction phase retardation value (Rth) of the positive A-plate in a wavelength range of green light is in a range of 96.0 nm to 98.0 nm, and wherein a first positive thickness-direction dispersion retardation value of the positive A-plate is substantially the same as the first positive in-plane dispersion retardation value of the positive A-plate, and the first positive thickness-direction dispersion retardation value is a ratio of an thickness-direction phase retardation value (Rth) in a wavelength range of blue light to the thickness-direction phase retardation value (Rth) in the wavelength range of green light, and wherein a second positive thickness-direction dispersion retardation value of the positive A-plate is substantially the same as the second positive in-plane dispersion retardation value of the positive A-plate, and the second positive thickness-direction dispersion retardation value is a ratio of a thickness-direction phase retardation value (Rth) in a wavelength range of red light to the thickness-direction phase retardation value (Rth) in the wavelength range of green light.

24. The display device of claim 23, wherein the wavelength range of the red light is in a range of 640 nm to 660 nm, and wherein the wavelength range of the green light is in a range of 540 nm to 560 nm, and the wavelength range of the blue light is in a range of 440 nm to 460 nm.

25. The display device of claim 13, wherein a difference between a negative wavelength-retardation value and a positive wavelength-retardation value in at least one of red light, green light and blue light is in a range of 0.20 to 0.30, and wherein the positive wavelength-retardation value is a ratio of the in-plane phase retardation value (Ro) of the positive A-plate to a wavelength (λ) of light, and the negative wavelength-retardation value is a ratio of the in-plane phase retardation value (Ro) of the negative A-plate to the wavelength (λ) of the light, and wherein Ro=(nx−ny)×d;

"nx" represents a refractive index in an x-axis direction, and "ny" represents a refractive index in a y-axis direction substantially perpendicular to the x-axis; and "d" is a thickness of the positive A-plate or the negative A-plate.

* * * * *